US00RE34913E

United States Patent [19]

Hiyoshi et al.

[11] E Patent Number: Re. 34,913

[45] Reissued Date of Patent: Apr. 25, 1995

[54] ELECTRONIC MUSICAL INSTRUMENT

[75] Inventors: Teruo Hiyoshi, Hamamatsu; Eisaku Okamoto, Hamakita; Eiichiro Aoki, Hamamatsu; Toshio Sugiura, Hamamatsu; Koichi Kozuki, Hamamatsu, all of Japan

[73] Assignee: Yamaha Corporation, Japan

[21] Appl. No.: 29,317

[22] Filed: Mar. 8, 1993

Related U.S. Patent Documents

Reissue of:

[64] Patent No.: 4,461,199
Issued: Jul. 24, 1984
Appl. No.: 448,367
Filed: Dec. 9, 1982

U.S. Applications:

[63] Continuation of Ser. No. 351,314, May 11, 1989, abandoned, which is a continuation of Ser. No. 884,764, Jul. 11, 1986, abandoned, which is a continuation of Ser. No. 180,032, Aug. 21, 1980, abandoned.

[30] Foreign Application Priority Data

Aug. 31, 1979 [JP] Japan ..... 54-110240

[51] Int. Cl.[6] ..... G10H 1/02; G10H 7/04

[52] U.S. Cl. ..... 84/603; 84/605; 84/615

[58] Field of Search ..... 84/603–607, 84/615–620, 622–633

[56] References Cited

U.S. PATENT DOCUMENTS

| | | | |
|---|---|---|---|
| 3,652,776 | 3/1972 | Milde, Jr. . | |
| 3,763,364 | 10/1973 | Deutsch et al. . | |
| 4,114,496 | 9/1978 | Deutsch | 84/1.1 |
| 4,147,083 | 4/1979 | Woron et al. | 84/1.01 |
| 4,184,403 | 1/1980 | Whitefield | 84/1.11 |
| 4,223,583 | 9/1980 | Deutsch | 84/1.01 |
| 4,227,435 | 10/1980 | Ando et al. | 84/1.19 |
| 4,257,303 | 3/1981 | Nagai et al. | 84/1.22 |
| 4,333,374 | 6/1982 | Okumura et al. | 83/1.01 |
| 4,383,462 | 5/1983 | Nagai et al. . | |
| 4,442,745 | 4/1984 | Gross et al. | 84/1.01 |

FOREIGN PATENT DOCUMENTS

| | | |
|---|---|---|
| 49-98150 | 9/1974 | Japan . |
| 50-52903 | 5/1975 | Japan . |
| 50-129010 | 10/1975 | Japan . |
| 50-131513 | 10/1975 | Japan . |
| 51-41515 | 4/1976 | Japan . |
| 51-57204 | 5/1976 | Japan . |
| 51-59207 | 5/1976 | Japan . |
| 51-78219 | 7/1976 | Japan . |
| 51-113609 | 10/1976 | Japan . |
| 52-7603 | 1/1977 | Japan . |
| 52-7606 | 1/1977 | Japan . |
| 52-122004 | 10/1977 | Japan . |
| 52-123106 | 10/1977 | Japan . |
| 53-74021 | 7/1978 | Japan . |
| 53-141018 | 12/1978 | Japan . |
| 61-20877 | 5/1986 | Japan . |

OTHER PUBLICATIONS

"Nikkei Electronics" No. 139, Jul. 26, 1976, pp. 92–130.
"Proceeding of the Digital Equipment Computer Users Society" pp. 1335–1339, 1347–1351.
"Computer Music Journal" vol. 2, No. 3, Issue No. 7, (Dec. 1978).
Affidavit, Letter dated Dec. 15, 1978, "The QUASAR M—8 Computer Synthesizer".

*Primary Examiner*—Stanley J. Witkowski
*Attorney, Agent, or Firm*—Graham & James

[57] ABSTRACT

In a keyboard musical instrument employing waveform memory, a user may program the number and order of waveforms to be sequentially read out from a waveform memory containing a plurality of different waveforms.

33 Claims, 14 Drawing Sheets

ELECTRONIC MUSICAL INSTRUMENT

Matter enclosed in heavy brackets [ ] appears in the original patent but forms no part of this reissue specification; matter printed in italics indicates the additions made by reissue.

This is a continuation of application Ser. No. *07/351,314 filed May 11, 1989, now abandoned, which is a continuation of Ser. No. 06/884,764, filed Jul. 11, 1986, now abandoned, which is a reissue of Ser. No. 06/448,367 filed Dec. 9, 1982, U.S. Pat. No. 4,461,199, which is a continuation of Ser. No.* 06/180,032, filed Aug. 21, 1980, now abandoned.

BACKGROUND OF THE INVENTION

This invention relates to an electronic musical instrument, and more particularly an electronic musical instrument in which musical tone signals stored in a musical tone data memory device and relating to a musical tone are read out according to the depression of a key of the keyboard of the musical instrument so as to produce a musical tone having the tone pitch corresponding to the depressed key.

An electronic musical instrument has been proposed as disclosed in German Pat. No. 2,715,510, for example, in which a musical tone signal having a plurality of periods from the start to the end of a musical tone applied from outside is sampled with a predetermined sampling period by a sampling signal, the amplitudes of the musical tone signal at respective sampling points are stored in respective storage positions of a musical tone data memory device and thereafter the stored musical tone signals are sequentially read out as a key is depressed, thereby forming a musical tone having a tone pitch corresponding to the depressed key.

This prior art electronic musical instruments, however, is constructed such that each of the amplitudes of the musical tone signal stored in the musical tone data memory device are accessed in a predetermined order to read out and reproduce the stored musical signals with high fidelities so that the tone color of the produced musical tone is not different from the tone color of the musical tone applied from outside.

Furthermore, with this prior art electronic musical instrument, when the musical tone signal stored in the musical tone data memory device are read out in response to a key depression, the musical tone signal is read out by an address signal progressing at a speed in proportion to the tone pitch of the depressed key, so that although it is possible to produce a musical tone having the pitch corresponding to the depressed key, there exists a disadvantage in that the interval of the musical tone generation from an attack to the termination of a decay varies depending upon the variation in the tone pitch of the depressed key. In other words, when the tone pitch of the depressed key is increased by one octave, the musical tone data memory device would be accessed by an address signal progressing at twice speed so that the musical tone producing interval from the attack to the end of the decay would be decreased to one half.

SUMMARY OF THE INVENTION

Accordingly, it is a principle object of this invention to provide an improved electronic musical instrument capable of producing a musical tone having a tone color desired by a performer.

Another object of this invention is to provide an improved electronic musical instrument capable of producing a musical tone having a length desired by a performer.

Still another object of this invention is to provide an electronic musical instrument in which the tone producing interval from the start of an attack to the end of a decay is made constant irrespective of a variation in the tone pitch of a depressed key.

To accomplish these objects, according to this invention, musical tone signals for responsive perios are detected from musical tone signals over a plurality of periods stored in a musical tone data memory device. The sequence that musical tone signals of desired periods are read out is designated by a performer and then the musical tone signals are read out one after another in the designated sequence.

According to a preferred embodiment of this invention, there is provided an electronic musical instrument comprising keyboard means having a plurality of keys; phase angle information generating means for generating a phase angle information corresponding to a depressed one of the keys; selection information setting means for establishing a selection signal designating a waveform to be generated as well as a order of generation of the waveform; waveform memory means for storing a plurality of the waveforms in the form of a plurality of sample values; means for generating from the waveform memory device a waveform designated by the selection information established by the selection information setting means at an order designated by the selection signal by reading out the sample values by the phase angle information; and musical tone generating means for generating a musical tone based on a plurality of the generated waveforms.

DESCRIPTION OF THE PREFERRED EMBODIMENT

Figure 2:
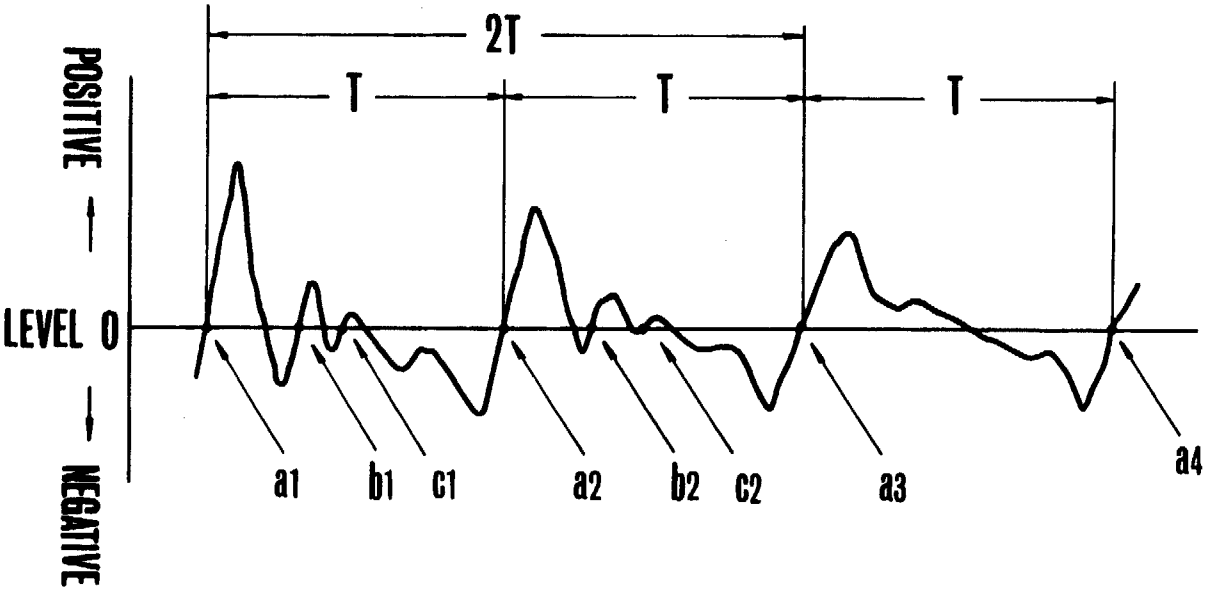
FIG. 2 shows a waveform useful to explain the meaning of the musical tone signals for different periods utilized in this invention.

In the specification, the term "musical signal" is used to generally designate an electrical signal obtained by converting any musical tone of a waveform as shown in FIG. 2. The term "period" is used to mean one of a plurality of intervals in each of which substantially the same waveform is repeated as shown in FIG. 2. Accordingly, in the following description, the term "a period musical tone signal" designates a musical tone signal and an interval shown by "T" in FIG. 2. When a musical tone signal is sampled at a predetermined sampling period and when the amplitude values of the musical tone signal at respective sampling points are stored in a musical tone memory device, a plurality of period musical tone signals would be stored in the memory device.

Figure 1:
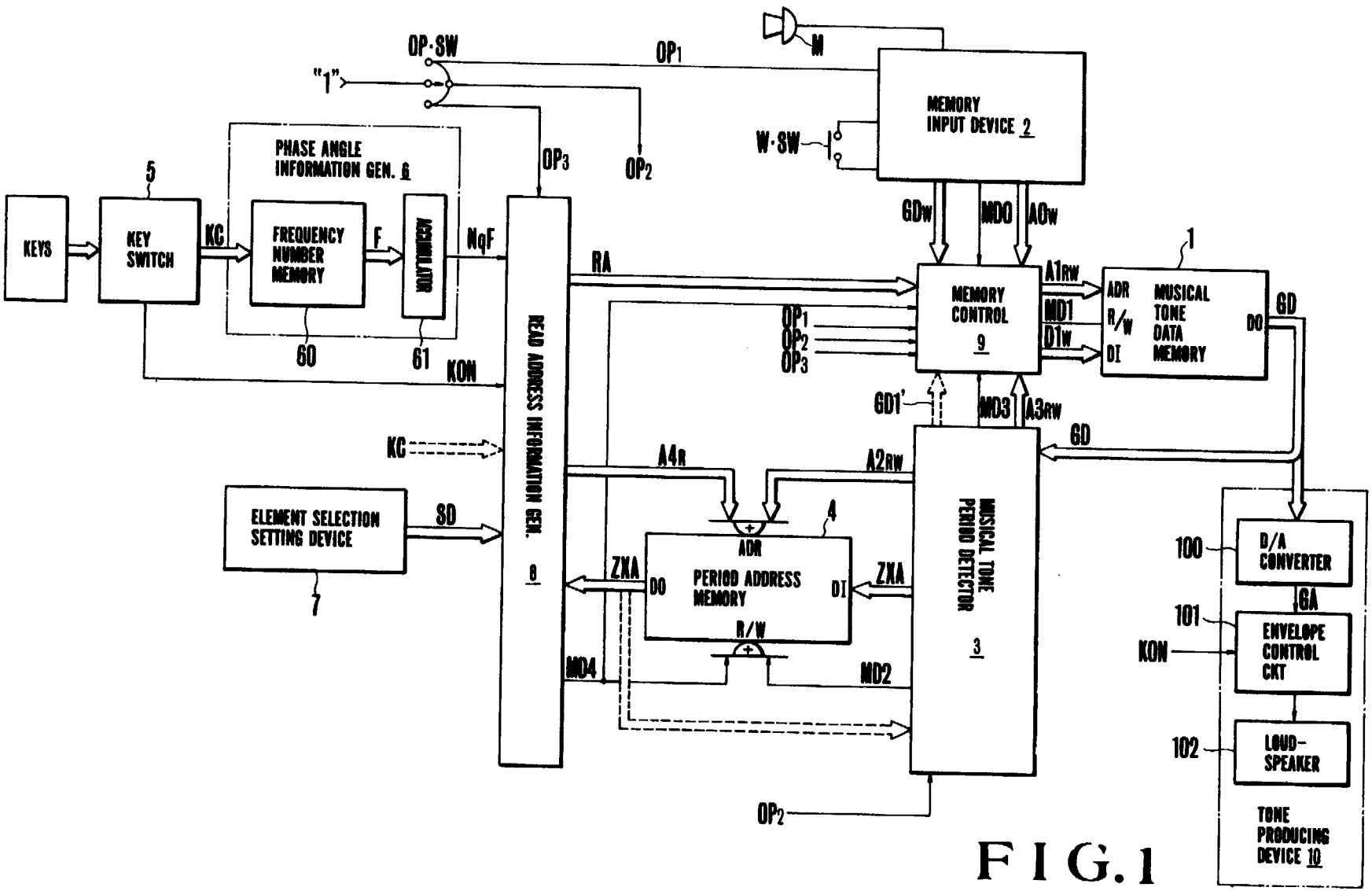
FIG. 1 is a block diagram showing one embodiment of the electronic musical instrument according to this invention.

The principal elements of the electronic musical instrument shown in FIG. 1 comprise a musical tone data memory device 1, a memory input device 2, a musical tone period detector 3, a period address memory device 4, a key switch circuit 5, a phase angle information generator 6, an element selection setting device 7, a read address information generator 8, a memory control device 9 and a tone producing device 10. These elements will be described in the following.

Musical Tone Data Memory Device 1

Referring now to FIG. 1, the musical tone data memory device 1 is constructed such that it assumes a write mode when a mode control signal MD1, applied to its read/write control terminal R/W is "1"; that it stores in the storage positions designated by its respecive addresses the sampling point amplitude values of an input musical tone supplied from the memory input device 2 through the memory control device 9 to be described later as a musical tone signal; that it assumes a read mode when the mode control signal MD1 is "O038 ; and that the musical tone signal which has been stored in the storage position corresponding to an address designated by an address information $A1_{RW}$ supplied to an address signal input terminal ADR through the memory control device 9 is read out. For the sake of convenience in the following description a musical tone signal now to be written into the musical tone data memory device 1 is designated by a symbol "$GD_W$", while both a musical tone signal already stored and a read out musical tone signal are designated by a symbol "GD", and a period musical tone signal is designated by a symbol "GD1".

Memory Input Device 2

Although the internal construction of the memory input device 2 is not shown, it comprises an address information generator which generates an address information whose value sequentially varies in response to a sampling clock signal of a predetermined period, and an analog to digital converter which converts an input musical tone signal into a digital musical tone signal. When the operation mode of the electronic musical instrument is set to a write mode to write an input musical tone supplied from outside in the memory input by the operation of a mode switch OP.SW, the memory input device 2 is enabled by a write mode signal $OP_1$ supplied by the mode switch OP.SW so as to sequentially sample a musical tone supplied to a microphone M to produce a digital musical tone signal $GD_W$ corresponding to the amplitude value of the input musical tone. The memory input device 2 produces a write address information $AO_W$ in synchronism with the musical tone signal $GD_W$ and a mode control signal MDO of "1" for changing the musical tone data memory device 1 to a write mode when a write switch W.SW is closed.

Musical Tone Period Detector 3

The musical tone period detector 3 is constructed to sequentially read the musical tone signal GD which has been stored in the musical tone data memory device 1 to detect all period musical tone signal that constitute the entire interval of the musical tone signal GD thereby producing a period address information ZXA representing an address of the musical tone data memory device 1 in which the detected period musical tone signal GD1 has been stored.

The above described processing in the musical tone period detector 3 is executed only when operating mode of the electronic musical instrument is set to a period musical tone signal detection mode by a mode switch OP.SW and a period detection mode signal $OP_2$ is "1". In other words, when a period detection mode signal $OP_2$ is "1", the musical tone period detector 3 firstly produces a mode control signal MD3 of "0" for the purpose of changing the musical tone data memory device 1 to a read mode and then produces an address information $A3_{RW}$ necessary for sequentially reading out the musical tone signal GD which has been stored in the musical tone data memory device 1. Then each of the period musical tone signals GD1 is detected out of the musical tone signals GD read out from the musical tone data memory device 1 and these detected period musical tone signals GD1 are supplied to the period address memory device 4 together with an address information $A2_{RW}$ for writing the period address informations ZXA representing respective addresses of the musical tone data memory device 1 in which the period musical tone signals GD1 have been stored. In this manner, the period address information ZXA is stored in a storage position corresponding to an address of the period address information memory device 4 designated by a write address information $A2_{RW}$.

Period Address Memory Device 4

When the operation mode of the electronic musical instrument is set to a period musical tone signal detection mode, the period address memory device 4 sequentially stores the period address information ZXA sent from the musical tone period detector 3 in a storage position corresponding to its addresses designated by an address information $A2_{RW}$. At the time of writing the period address information ZXA, a mode control signal MD2 of "1" is applied to a read/write control terminal R/W of the memory device 4 from the musical tone period detector 3 to switch the memory device to the write mode. At this time, the period address information ZXA is stored according to an order of storing the period musical tone signals GD1 corresponding to the period address information ZXA in the musical tone data memory device 1. In other words, a period address information ZXA corresponding to the period musical tone signal GD1 of the first period at the build-up portion of a musical tone signal applied from outside is stored in a storage position designated by the least significant address of the period address memory device 4, whereas a period address information ZXA corresponding to the last period musical tone signal GD1 at the end portion of the externally supplied musical tone is stored in a storage position designated by the most significant address.

The period address memory device 4 is also accessed by the read address information generator 8. More particularly, when a mode control signal MD4 of "0" is supplied from the read address information generator 8 while the electronic musical instrument is being set to a performance mode, the operation mode is switched to a read mode to read out the period address information ZXA that has been stored in a storage position corresponding to an address designated by a read address information $A4_R$. The musical tone period detector 3 and the read address information generator 8 access the period address memory device 4 in respective modes designated by the mode switch OP SW so that the address information $A2_{RW}$ and $A4_R$ for the period address memory device 4 and the mode control signals MD2 and MD4 do not interfere with each other.

Key Switch Circuit 4

The key switch circuit 5 includes a plurality of key switches corresponding to respective keys of the keyboard and is constructed in such manner that when a key is depressed a corresponding key switch is operated to produce a key code KC consisting of a note code NC corresponding to the tone pitch of the depressed key and a octave code BC, and a key-on signal KON representing that one of the keys has been depressed. The key switch circuit contains a monotone priority circuit so that when two or more keys are depressed at the same time, only a key code corresponding to a key switch having the highest priority is produced.

Phase Angle Information Generator 6

The phase angle information generator 6 comprises a frequency number memory device 60 that stores frequency numbers F corresponding to the tone pitches of respective keys and an accumulator 61 which sequentially accumulates at a predetermined period, the frequency number F read out from the frequency number memory device 60. When a key code KC corresponding to the tone pitch of the depressed key from the key switch circuit 5 is supplied to the frequency number memory device 60, a frequency number F corresponding to this key code KC is read out from the frequency number memory device 60. As above described, the accumulator 61 sequentially accumulates, at a predetermined period, the frequency numbers F read out from the frequency number memory device 60 to form an accumulated value qF (q=1,2,3 . . . ). When the accumulated value qF reaches a predetermined value, a carry output signal NqF is produced having a period corresponding to the tone pitch of the depressed key.

Element Selection Setting Device 7

The element selection setting device 7 is provided with such data setting keyboard as a ten key or the like for manually setting a selection information SD for reading out a desired period musical tone signal GD1 from the musical tone memory device 1. In this embodiment, according to a format shown in the following Table 1, serial numbers $M_n$ and repeating read number information $R_n$ which comprise the first selection information SD, and a pair of sustain serial number informations $CN_n$, and an end information $E_n$ which constitute the second selection information SD are set.

TABLE 1

| | first selection information SD | | second selection information SD | |
|---|---|---|---|---|
| read out order | $M_n$ | Rn | $CN_n$ | En |
| 1 | 1 | 2 | 20 | 50 |
| 2 | 3 | 2 | | |
| 3 | 5 | 3 | | |
| . | 7 | 5 | | |
| . | 20 | 2 | | |
| . | . | . | | |
| . | . | . | | |
| . | . | . | | |
| . | . | . | | |
| . | 50 | 3 | | |

In Table 1, the term "$M_n$" (serial number) information represents a serial or order number (*first to Nth*) according to which desired period musical tone signals GD1 are stored in the musical tone data memory device 1, while the term "$R_n$" (repeating read number information) represents the number of times of repeatedly reading out a period musical tone signal $GD_1$ designated by the serial number information $M_n$. *First to Nth terms Rn are provided in correspondence with first to Nth terms Mn, i.e., the Kth repetition number corresponds to the Kth waveform where* $1 \leqq K \leqq N$. Further, the term "$CN_n$" (sustain serial number information) means an information representing the order of the numbers according to which a period musical tone signal GD1 forming a sustained portion of a musical tone to be presently formed is stored in the musical tone data memory device 1, whereas the term "$E_n$" (end number information) means an information representing an order number according to which a period musical tone signal GD1 forming the end portion of a musical tone presently to be formed is stored in the musical tone data memory device 1, one end number information $E_n$ and one sustain serial number information $CN_n$ being set for one musical tone produced.

Where these four types of informations are as shown in Table 1, period musical tone signals GD1 firstly designated by $M_n=1$ are repeatedly read out by the number of times designated by $R_n=2$, and the period musical tone signals GD1 secondly designated by $M_n=3$ are repeatedly read out by the number of times designated by $R_n$32 2. In the same manner, thereafter, the period musical tone signals GD1 designated by the serial number information $M_n$ are repeatedly read out by the number designated by the repeating read number information $R_n$. Thereafter, when read out of a period musical tone signal information GD1 represented by $CN_n=20$ is designated, the period musical tone signal GD1 represented by $CN_n=20$ would be repeatedly read out until a depressed key is released, thus producing a musical tone corresponding to the sustain portion. Thereafter, when the key is released, a period musical tone signal GB1 designated by the next read order information $M_n$ is repeatedly read out by a number of times designated by the repeating read number information $R_n$. Thereafter when read out of a period musical tone signal GD1 shown by $E_n=50$ is designated, the period musical tone signal GD1 represented by $E_n=50$ would be repeatedly read out until a new key is depressed. The selection information SD set in the element selection setting device 7 is transferred to and stored in a memory device in the read address information generator 8 to be described hereunder.

Read Across Information Generator 8

The addresses in the musical tone data memory 1 corresponding to the period musical tone signal GD1 designated by the respective selection informations SD for respective read orders set by the element selection setting device 7 are detected according to the period address information ZXA stored in the period address memory device 4 to produce a read address information RA which sequentially varies at a period of a period signal NqF produced by the phase angle information generator 6 based on the respective period address informations ZXA corresponding to respective selection information SD. Such processing is executed when the operation mode of the electronic musical instrument is set by the mode switch OP.SW to the performance mode in which a performance signal $OP_3$ is "1".

More particularly, when the performance mode signal $OP_3$ given is "1", the read address generator 8 firstly produces the mode control signal MD4 of "0" for the purposes of rendering the period memory device 4 and the musical tone data memory device 1 to become the read mode. Then, address informations $A4_R$ corresponding to respective informations $M_n$, $CN_n$ and $E_n$ are sequentially supplied to the period address memory device 4 for the purpose of detecting the addresses of the musical tone data memory device 1 in which the period musical tone signal GD1 corresponding to the serial number information $M_n$, the sustain serial number information $CN_n$ and the end number information $E_n$ among selection signals SD set by the element selection setting device 7. The period address information ZXA corresponding to respective information $M_n$, $CN_n$ and $E_n$ are sequentially read out from the period address memory device 4 and then stored in the memory device in the read address information generator 8. When the key switch 5 generates a key-on signal as a result of depression of a key of the keyboard, a read address information is formed which sequentially varies at a period of the period signal NqF in accordance with the period address information ZXA, and the address information RA is supplied to the musical tone data memory device 1 through the memory control device 9. The read address information RA as described before depends upon the repeating read number information $R_n$, the sustain serial number information $CN_n$ and the end number information $E_n$.

The Memory Control Device 9

The memory control device 9 selectively controls the access to the musical tone data memory device 1 from the memory input device 2, the musical tone period detector 3, and the read access information generator 8 in accordance with the operation modes (write mode, period musical tone signal detection mode, and performance mode of the electronic musical instrument to supply to the musical tone data memory device 1 an address information $A1_{RW}$, a mode control signal MD1, and a write data $D1_W$. In other words, the memory control device 9 selects the input signals according to the following Table 2 and applied the selected input signals to the musical tone data memory device 1.

TABLE 2

| Operation mode | Output | | |
|---|---|---|---|
| | $A1_{RW}$ | MD1 | $D1_W$ |
| Write mode $COP_1$ = "1" | $A0_W$ | MD0 | $GD_W$ |

TABLE 2-continued

| Operation mode | Output | | |
|---|---|---|---|
| | $A1_{RW}$ | MD1 | $D1_W$ |
| Period musical tone signal detection mode $COP_2$ = "1" | $A3_{RW}$ | MD3 | — |
| Operation mode $OP_3$ = "1" | RA | MD4 | — |

Tone Producing Device 10

The tone producing device 10 comprises a digital to analog converter 100, an envelope control circuit 101 and a loudspeaker 102. When desired period musical signals GD1 are successively read out from the musical tone data memory device 1 and supplied to the tone producing device 10 as a continuous musical tone signal GD, this digital signal GD is converted into a corresponding analog musical tone signal GA whose amplitude is set by an envelope signal EV produced in synchronism with the build-up of the key-on signal in the envelope control circuit 101. Thereafter the musical tone signal with controlled amplitude envelope is supplied to the loudspeaker 102 so as to produce a musical tone corresponding to the period musical tone signals GD1 sequentially read out from the musical tone data memory device 1.

The operation of the electronic musical instrument will now be described with reference to the flow chart shown in FIG. 3.

Figure 3:
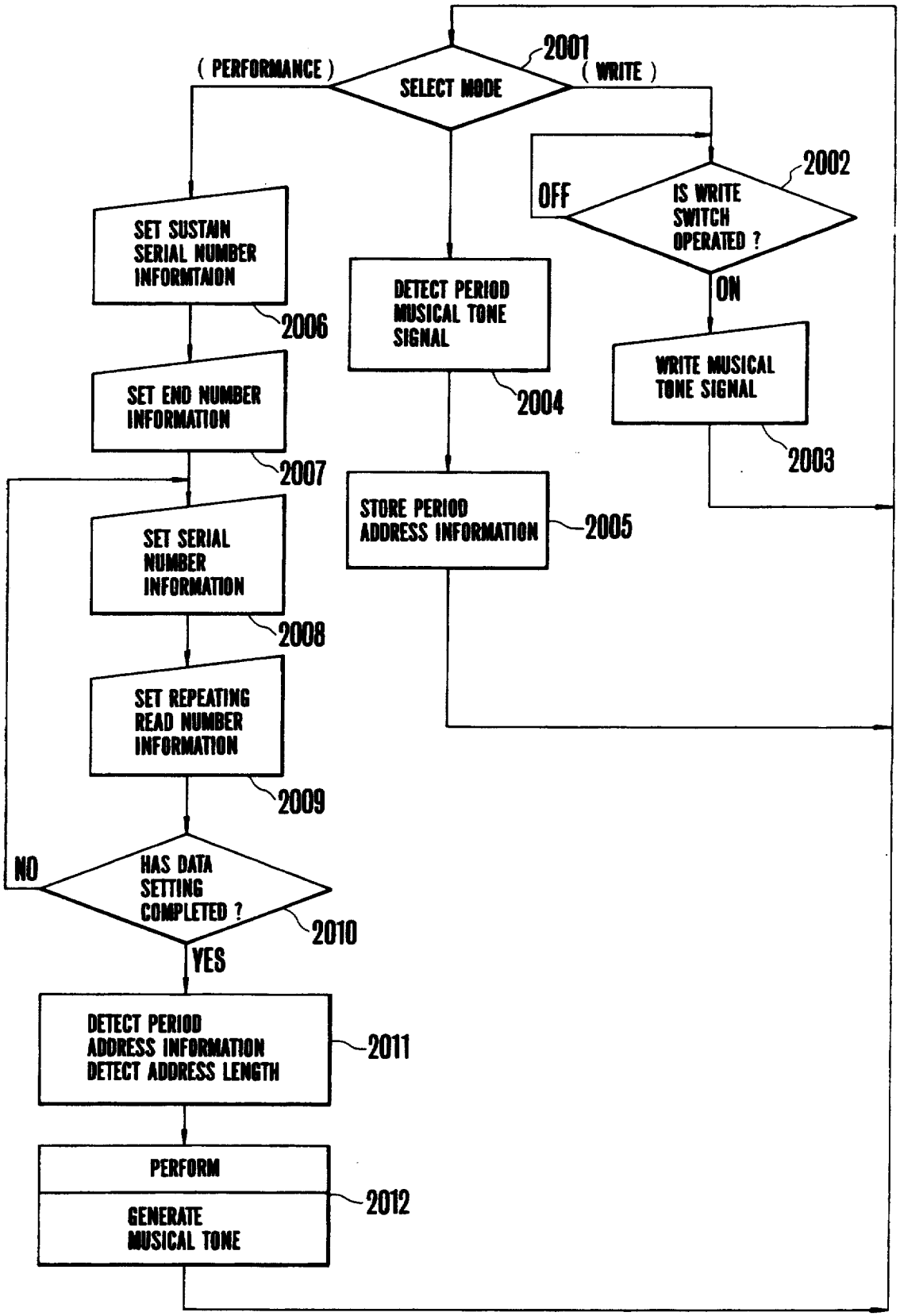
FIG. 3 is a flow chart useful to explain the entire operation of the electronic musical instrument shown in FIG. 1.

As shown in step 2001 in FIG. 3, for the purpose of writing a musical tone signal $GD_W$ corresponding to a musical tone supplied from outside into the musical tone data memory device 1 the operation mode of the electronic musical instrument is set to a write mode by using the mode switch OP·SW. Then at step 2002 the write switch W·SW is closed. In this state, when a musical tone is applied to the microphone M from outside, this musical tone is sampled at a predetermined period in the memory input device 2 to be converted into a corresponding digital musical tone signal which is supplied to a memory control device 9 and then supplied therefrom to the musical tone memory device 1 as a write data $D1_W$. At this time, the memory input device 2 supplies to the memory control device 9 the musical tone signal $GD_W$ together with a write address information $AO_W$ that designates the write address of the musical tone signal $GD_W$ and a mode control signal MDO for changing the musical tone data memory device 1 to the write mode and the memory control device 9 supplies an address information $A1_W$ and a mode control signal MD1 to the musical tone data memory device 1. As a consequences at step 2003, musical tone signals $GD_W$ corresponding to respective sampling point amplitude values obtained by sampling the musical tone signal coming from outside at a predetermined period are sequentially stored in the addresses of the musical tone data device 1. At this time, the musical tone signals $GD_W$ are sequentially stored from the least significant address toward the most significant address of the memory device 1.

Upon completion of the writing of the musical tone signal $GD_W$ the operation mode of the electronic musical instrument is changed to the period musical tone detection mode by operating the mode switch OP SW. Then at step 2004, the period musical tone signals GD1 of respective periods are detected from the musical tone signals GD which have been continuously stored in the musical tone data memory device 1. Then at step 2005, reference point informations representing the addresses of the musical tone data memory device 1 storing the reference portions of respective period musical tone signals detected as above described are stored in respective storage positions corresponding to addresses of the period address memory device 4 as the period address informations. At this time, in the least significant address of the period address memory device 4 is stored a period address information ZXA corresponding to the first period musical tone signal GD1 at the building up portion of the external musical tone signal, whereas in the most significant address is stored a period information ZXA corresponding to the last period musical tone signal GD1 at the end portion of the external musical tone.

Upon completion of the detection of the period musical tone signals, the mode switch OP SW is operated to set the operation mode of the electronic musical instrument to the performance mode.

At the performance mode, at steps 2006 through 2010, various selection informations SD are set for selectively reading out the desired period musical tone signals GD1. More particularly, at step 2006 a sustain serial number information $CN_n$ is set and at the next step 2007, the end number information $M_n$ is set. At the next step 2009 the repeating read number information $R_n$ is set. In this case the serial number information $M_n$ and the repeating read number information $R_n$ are set as a pair for each order of reading. Then the program is advanced to step 2010 to judge whether the data setting has been completed or not. When the result of judgement is NO, the program is returned to step 2008 to set an information at the next read out order. Thereafter, the steps 2008 and 2009 are repeatedly executed for each order of reading out. Informations $CN_n$, $E_n$, $M_n$ and $R_n$ sequentially set as above described are sequentially stored in the memory device in the read address information generator 8 according to the format shown in Table 1.

When the completion of the setting of all section signals SD ($CN_n$, $E_n$, $M_n$ and $R_n$) is confirmed at step 2010, the program is advanced to step 2011 where the period address information ZXA ($M_n$) corresponding to the serial number information $M_n$, the period address information ZXA ($CN_n$) corresponding to the sustain serial number information $CN_n$ and the period address information ZXA ($E_n$) corresponding to the end number information $E_n$ are detected based on the memory content of the period address memory device 4, and the length of the memory address of the musical tone data memory device 1 of the period musical tone signal GD1 corresponding to the serial number information $M_n$ is detected according to the content of the period address memory device 4. Thus, at step 2011, informations $M_n$, $CN_n$ and $E_n$ are converted into corresponding period address informations ZXA ($M_n$), ZXA ($CN_n$) and ZXA ($E_n$) while at the same time the memory address length of the period music tone signal GD1 is calculated. These period address informations ZXA ($M_n$), ZXA ($CN_n$), ZXA ($E_n$) and the memory address length information AL representing the memory address length are stored in a memory device installed in the read address information generator 8. In this regard, the period address information ZXA ($M_n$) represents an address of the musical tone data memory device 1 storing the starting point of the period musical tone signal GD1 corresponding to a serial number information $M_n$, whereas the period address informations ZXA ($CN_n$) and ZXA ($E_n$) represent an address of the musical tone data memory device 1 which stores end portion of the period musical tone signal GD1 corresponding to a sustain serial number information $CN_n$ and an end number information $E_n$.

Consequently, where the period address informations ZXA stored in the addresses of the period address memory device 4 are shown in the following Table 3 and where the serial number information $M_n$, the sustain serial number information $CN_n$ and the end number information $E_n$ which are set as a selection information SD is shown in the Table 1 described above, period address informations ZXA ($M_n$), ZXA ($CM_n$), ZXA ($X_n$), an address length information AL as a repeating read number information $R_n$ would be set as shown in the following Table 4 where processings of setting informations regarding the all read out orders have been completed.

TABLE 3

| Address | Period address information ZXA |
|---|---|
| 0 | 256 |
| 1 | 509 |
| 2 | 759 |
| 3 | 1019 |
| 4 | 1275 |
| 5 | 1527 |
| 6 | 1777 |
| 7 | 2035 |
| 8 | 2285 |
| . | . |
| . | . |
| . | . |
| 20 | 5035 |
| 21 | 5288 |
| . | . |
| . | . |
| . | . |
| 50 | 12285 |
| 51 | 12539 |
| . | . |
| . | . |
| . | . |

TABLE 4

| Read out order | Selection information SD | | |
|---|---|---|---|
| | ZXA ($M_n$) | AL | $R_n$ |
| 1 | 509 | 250 | 2 |
| 2 | 1019 | 256 | 2 |
| 3 | 1527 | 250 | 3 |
| | 2035 | 250 | 5 |
| | 5035 | 253 | 2 |
| | . | . | . |
| | . | . | . |
| | . | . | . |
| | 12285 | 254 | 3 |

| Selection information SD | |
|---|---|
| ZXA ($CN_n$) | ZXA ($E_n$) |
| 5288 | .12539 |

After completing the setting and the processing of all informations, at step 2012 the performer depresses keys to produce a musical tone signal based on various informations ZXA ($M_n$), AL, $R_n$, ZXA ($CN_n$) and ZXA ($E_n$) which have been set at various steps 2006 through 2011. More particularly, as a key of the keyboard is depressed the key switch circuit 5 produces a key-on signal KON and a key code KC corresponding to the depressed key. The key code KC is applied to the period phase angle information generator 6 whereby the generator 6 produces a period signal NqF having a period corresponding to the tone pitch of the depressed key. This period signal is applied to the read address information generator 8. The key-on signal generated by the key switch circuit 5 too is applied to the read address information generator 8 which is initialized by the building up portion of the key-on signal KON. The period address information ZXA ($M_n$) which gradually increases at the period of the synchronizing signal NqF is repeated by reading out by a number of times designated by the repeating read number information $R_n$ starting from the period address information ZXA ($M_n$) of the first order of read out until an information [ZXA ($M_n$)+AL] is reached. The read out information RA produced in this manner is supplied to the musical tone data memory device 1 via the memory control device 9. Accordingly, a period musical tone signal GD1 corresponding to a serial number information $M_n$ set at first order of read out would be repeatedly read out from the musical tone data memory device 1 by a number of times designated by a repeating read number information $R_n$.

Upon completion of reading out the period musical tone signal GD1 in accordance with a selection information SD($M_n$, $R_n$) at the first order of reading, the period musical tone signal GD1 is read out in the same manner according to a selection signal SD ($M_n$, $R_n$) at the second order of read out.

While the key is being depressed (during an interval in which the key-on signal KON is "1"), when the reading out of a period musical tone signal GD1 corresponding to a sustain read number information $CN_n$ is designated by a read out address information RA, thereafter the period musical tone signal GD1 corresponding to that information $CN_n$ would be repeatedly read out, such repeating read out is continued until the key-on signal KON becomes "0", thereby forming a sustain portion of the produced musical tone. When the key is released, reading out of the periodic musical tone signal GD1 will be continued again in accordance with a selection information SD ($M_n$, $R_n$) at the next order of read out. Thereafter, when the reading out of a period musical tone signal GD1 corresponding to the end number information $E_n$ is designated by the read address information RA, thereafter the period musical tone signal GD1 corresponding to that information $E_n$ would be repeatedly read out until a next new key is depressed, thus forming the end portion of the musical tone produced.

As above described, the period musical tone signals read out from the musical tone data memory device 1 are continuously applied to the tone producing device 10 so as to produce a musical tone corresponding to the selection signal SD.

The detail of the musical tone period detector 3 and the read address information generator 8 will now be described as follows.

Musical Tone Period Detector 3

The musical tone period detector 3 is constituted by a microprocessor or the like and detects the period musical tone in the following manner.

Where the period musical tone signal GD1 is defined as above described, the musical tone data memory device 1 stores a plurality of period musical tone signals GD1. However, such stored period musical tone signals GD1 are not stored individually or separately but stored as a continuous musical tone signal. Accordingly, in order to designate and read out period musical tone signals for different periods from such continuous musical tone signal, it is necessary to determine the origin or starting point of each period. In the embodiment, the origin of each period musical tone signal GD1 is determined according to the following conditions.

Condition A

This condition requires that the musical tone signal amplitude should be zero at the sample point.

In a case where a musical tone signal includes a repetition of the substantially the same waveform as shown in FIG. 2, any sampling point may be selected as the "origin of the period" but generally the zero cross sampling point at which the musical tone signal amplitude becomes zero is adopted.

Condition B

This condition requires that the musical tone signal amplitude should be the zero cross sampling point at which the amplitude changes in the positive direction.

Among the zero cross sampling points at which the amplitude of the musical tone signal becomes zero are included a zero cross sampling point at which the amplitude changes from positive to negative (negative going) and the other zero cross samplin point at which the amplitude changes from negative to positive (positive going). Either one of these two zero cross points may be used, but in this embodiment the positive going type zero cross point is used.

Condition C

Where a plurality of positive going zero cross sampling points present in a constant musical tone signal interval, the integrated value of the musical tone signal amplitudes in a predetermined period around each positive going zero cross sampling point should manifest a maximum value.

Figure 4:
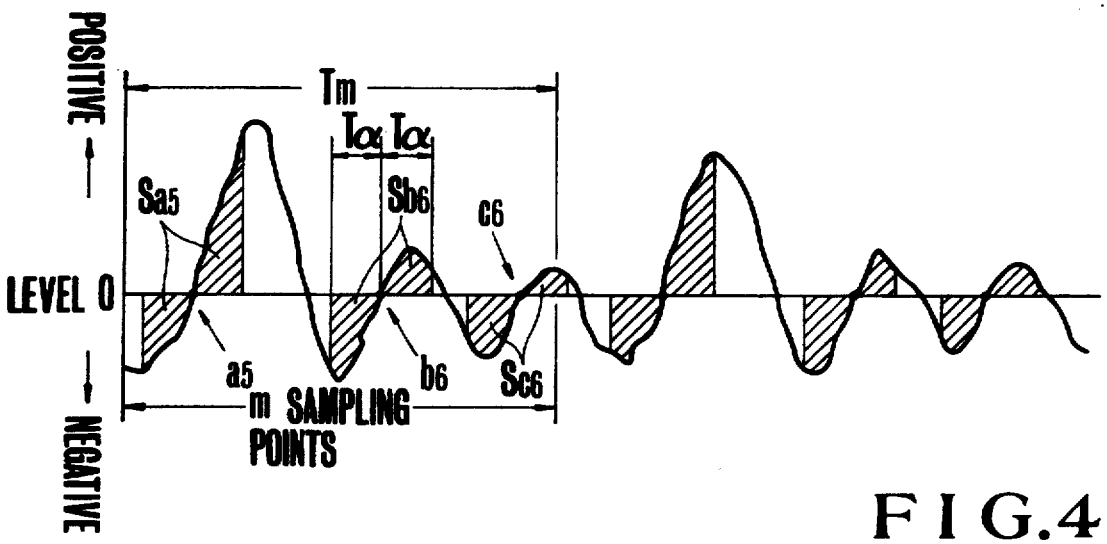
FIGS 4 through 11 show waveforms and flow charts useful to explain a method of detecting musical tone signals for different periods.

More particularly, as shown in FIG. 2, where the musical tone signal contains a plurality of harmonic components, as designated by $a_1$, $b_1$ and $c_1$ or $a_2$, $b_2$ and $c_2$, a plurality of positive going zero cross sampling points appears in a constant musical tone signal period. In this case, when the positive going zero cross sampling point $b_1$ in the first musical tone signal period is adopted, although in the second musical tone signal period a positive going zero cross sampling point $b_2$ corresponding to the positive going zero cross sampling point $b_1$ exists, in the third musical tone signal period there is no such positive going zero cross sampling points corresponding to the points $b_1$ and $b_2$. For this reason the interval of the period musical tone signal becomes unstable. In other words, such positive going zero cross sampling points as shown by $b_1$, $b_2$ and $c_1$ and $d_2$ in the waveform shown in FIG. 2 may readily appear or disappear due to the variation in the level of the harmonic component or phase variation meaning unstable positive going zero cross sampling points. Where such unstable positive going zero cross sampling point is used as the origin of a period musical tone signal, it is clear that the interval of the period musical tone signal becomes unstable. Conversely, the amplitude values before and after such positive going zero cross points, $a_1$, $a_2$, $a_3$ and $a_4$ in the waveform shown in FIG. 2, are sufficiently large so that the amplitude value would not be affected greatly by the level variation or phase variation of the harmonic components. Thus, it can be considered that these positive going zero cross sampling points exist over a substantially long period of the musical tone signal. Accordingly, where such positive going zero cross sampling point is set as the origin of the period musical tone signal, the interval of the period musical tone signal would become relatively stable. For the purpose of setting the positive going zero cross sampling points $a_1$, $a_2$, $a_3$ and $a_4$ as the origins of the period musical tone signals, as in the waveform shown in FIG. 4, the integrated values $S_{a5}$, $S_{b6}$ and $S_{c6}$ of the musical tone signal amplitudes over predetermined intervals $T\alpha$ about respective position going zero cross sampling points $a_5$, $b_5$ and $c_6$ are calculated and the positive going zero cross sampling point $a_5$ corresponding to the maximum integrated value $S_{a5}$ is detected. Assuming that an input musical tone is expressed by $A_4=440$ Hz, a sampling frequency is 50 Hz. for example, and that $n=103$, $\beta=22$, $T_m=3$ ms and $T\alpha=200$ $\mu$s. This detection is performed as follows. Thus, since the level variation and the phase variation of the harmonic component of a musical tone signal are large near the build-up portion thereof, in a musical tone signal interval in which the musical tone has become sufficiently stable, a positive going zero cross sampling point which is used as a reference in the entire period of the musical tone signal is determined by the method described above, and thereafter the detection range is sequentially shifted in an attack direction and a decay direction by utilizing the reference positive going zero cross point as the center.

As above described, the positive going zero cross sampling point utilized as the origin of the period musical tone signal is selected, a positive going zero cross sampling point indicative of an end point corresponding to the positive going zero cross sampling point utilized as the origin, that is the positive going zero cross sampling point to be used as the origin of the period musical tone signal of the next period is set in the following manner. More particularly, where a musical tone of a certain frequency is sequentially sampled at a predetermined period, it is possible to anticipate the number of sampling points corresponding to the period of the musical tone signal (the number of the sampling points is assumed to be n). For example, where the musical tone A4=440 Hz and the sampling frequency is 50 KHz, the number n is equal to 103. For this reason, as has been described in connection with the condition C, once a positive going zero cross sampling point utilized as the origin of a period musical tone signal is set, the positive going zero cross sampling points in a range of $(+n+\beta)$ around the positive going zero cross sampling point thus set are detected and then a positive going zero cross sampling point satisfying the condition C is set as the origin of a period musical tone signal one period after. More particularly, as shown by the waveform shown in FIG. 5, in order to set a positive going zero cross sampling point utilized as the origin of the period musical tone signal one period after, a positive going zero cross sampling point $a_1$ in a range of $(+n+\beta)$ is detected by using the initially set positive going zero cross sampling point $a_0$ as a reference point, and then this positive going zero cross sampling point $a_1$ is set as the origin of a new period musical tone signal. In this case, in the range of $(+n+\beta)$ where a positive going zero cross sampling point satisfying the condition C is not present, the detection range is expanded further, thus setting the first positive going zero cross sampling point as a new origin irrespective of the magnitude of the integrated values under condition C.

Where a positive going zero cross sampling point utilized as the origin of a period musical tone signal one period before a period musical tone signal in which the origin was first detected is detected, a positive going zero cross point sampling point in a range of $(-n-\beta)$ may be detected in the same manner as above described by using the firstly detected positive going zero cross sampling point as a reference point.

Although in the foregoing description, a fundamental method of setting a positive going zero cross sampling point utilized as the origin of the period musical tone signal was described, methods of setting as shown in the following cases A and B can also be used for processing various complicated musical tone signals.

Case A

There is no zero cross sampling point.

Figure 6:
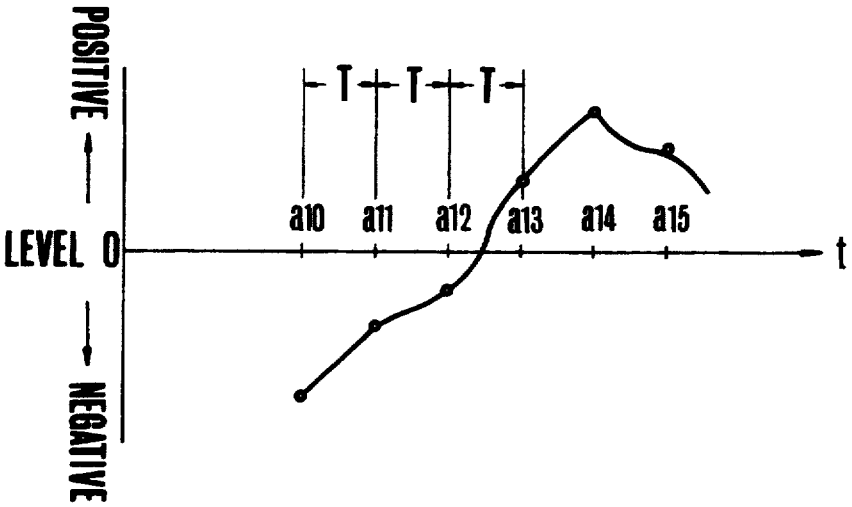

As above described, the origin of a period musical tone signal is set to a positive going zero cross sampling point wherein the integrated value of a musical tone signal in a predetermined interval $T\alpha$ around a positive going zero cross sampling point among a plurality of positive going zero cross sampling points existing in a definite musical tone signal inerval $T_m$, but since there is a limit for the sampling period of the musical tone signal there is a case in which no positive going zero cross sampling point exists in successive sampling points $a_1$. 0–$a_{15}$ as the waveform shown in FIG. 6. In such a case, among the sampling points (in FIG. 6, $a_{12}$ and $a_{13}$) before and after a point at which the musical tone signal amplitude is zero, the sampling point whose absolute amplitude is smaller is set at the positive going zero cross sampling point. In the waveform shown in FIG. 6, the sampling point $a_{12}$ is set as the positive going zero cross sampling point.

Case B

In this case there are two or more positive going zero cross sampling points satisfying condition C.

Figure 7:
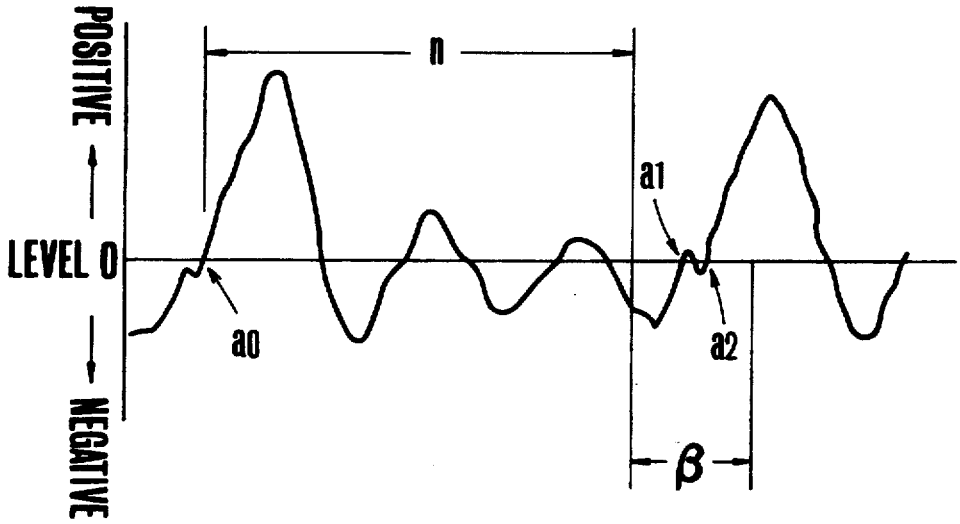

Regarding the waveform shown in FIG. 7, where it is desired to set a positive going zero cross sampling point after setting a reference positive going zero cross sampling point $a_0$ satisfying the condition C, there may be a case in which there are two or more positive going zero cross sampling points satisfying the condition C in a range of $(a_0+n\pm\beta)$. In such a case, correlation coefficients between the waveform before and after the positive going zero cross sampling points $a_1$ and $a_2$ and the waveform before and after the reference positive going zero cross sampling point $a_0$ are compared and a positive going zero cross sampling point having large correlation coefficient is used. The comparison of the correlation coefficients can be made as follows.

Figure 8:
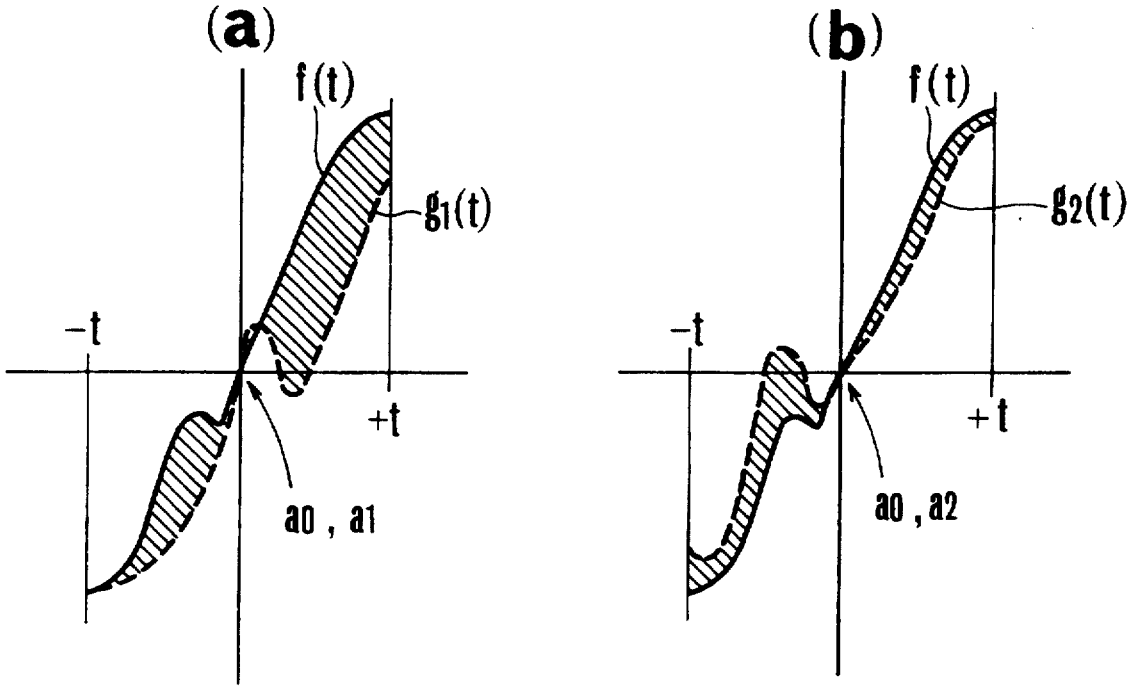

More particularly, as shown in FIGS. 8a and 8b, an area $$\sum_{-t}^{t} |f(t) - g_1(t)|$$

bounded by a musical tone signal waveform f(t) passing through a positive going zero cross sampling point $a_0$ and a musical tone signal waveform $g_1(t)$ passing through a positive going zero cross sampling point $a_1$ in an interval $-t_1$ to $+t$ is calculated, and an area $$\sum_{-t}^{t} |f(t) - g_x(t)|$$

bounded by the musical tone signal f(t) and a positive going zero cross sampling point $a_2$ in an interval $-t$ to $+t$ is also calculated. Of these two areas thus calculated, the positive going zero cross sampling point corresponding to the smaller area is judged as that having the largest correlation coefficient with respect to the reference positive going zero cross sampling point. Where there are two positive going zero cross sampling points $a_1$ and $a_2$ in the case shown in FIG. 7, as can be noted from FIGS. 8a and 8b, the positive going zero cross sampling point $a_2$ is set as the origin one period after the reference positive going zero cross sampling point $a_0$.

Summarizing the above, under the conditions described above, a reference positive going zero cross sampling point is firstly set which is used as a reference in a musical tone interval in which the musical tone is stable and positive going zero cross sampling points are sucessively set one period before, two periods before + . . . with reference to the reference sampling point until the start portion of the musical tone signal is reached. Then, positive going zero cross sampling points one period after, two periods after . . . with reference to the firstly set reference point are sequentially set until the attenuation portion of the musical tone signal is reached. In this manner, all origins of the period musical tone signals are set from the start to the end of the musical tone. In the following, a period musical tone signal corresponding to the reference positive going zero cross sampling point is called a reference period musical tone signal GD1m.

Consequently, to designate and read out a desired period musical tone signal GD1 from musical tone signal between its start and end, the following method of designation is used.

A. An address of the musical tone data memory device corresponding to a positive going zero cross sampling point utilized as the origin of each period is given as an origin address information which is used to designate a desired period musical tone signal GD1.

B. Addresses of musical tone data memory device corresponding to the positive going zero cross sampling points at the start and end of each period are given as an origin address information and an end point information respectively so as to designate a desired period musical tone signal GD1.

C. A serial number information representing the order of storing respective period musical tone signals GD1 in the musical tone data memory device 1 is given and the serial number information is decoded to know that this serial number information corresponds to which one of the origin address informations, thereby designating a desired period musical tone signal GD1.

D. Memory areas of the musical tone data memory device are allocated to different period musical tone signals GD1 and the desired period musical tone signal GD1 is designated by an information corresponding to a given memory area. This method D is substantially same as the method B.

In the electronic musical instrument shown in this embodiment, the method of designation C is adopted.

Figure 9:
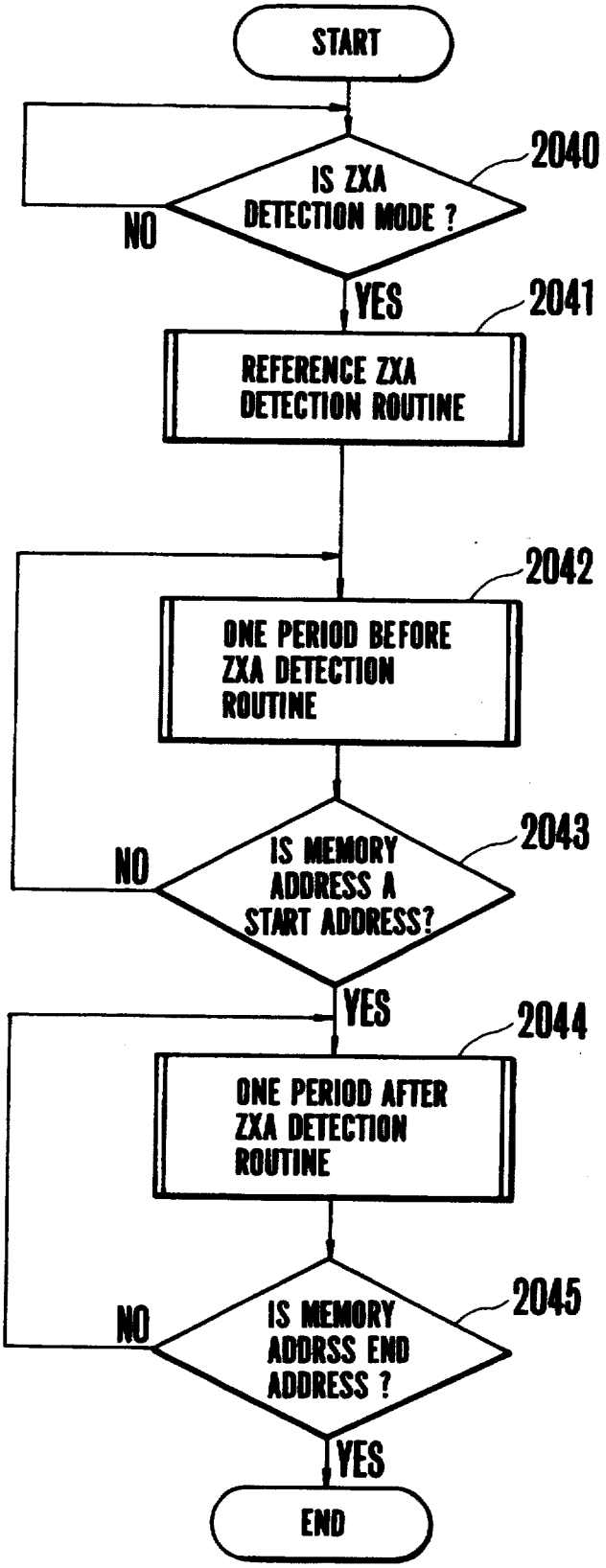
Figure 10:
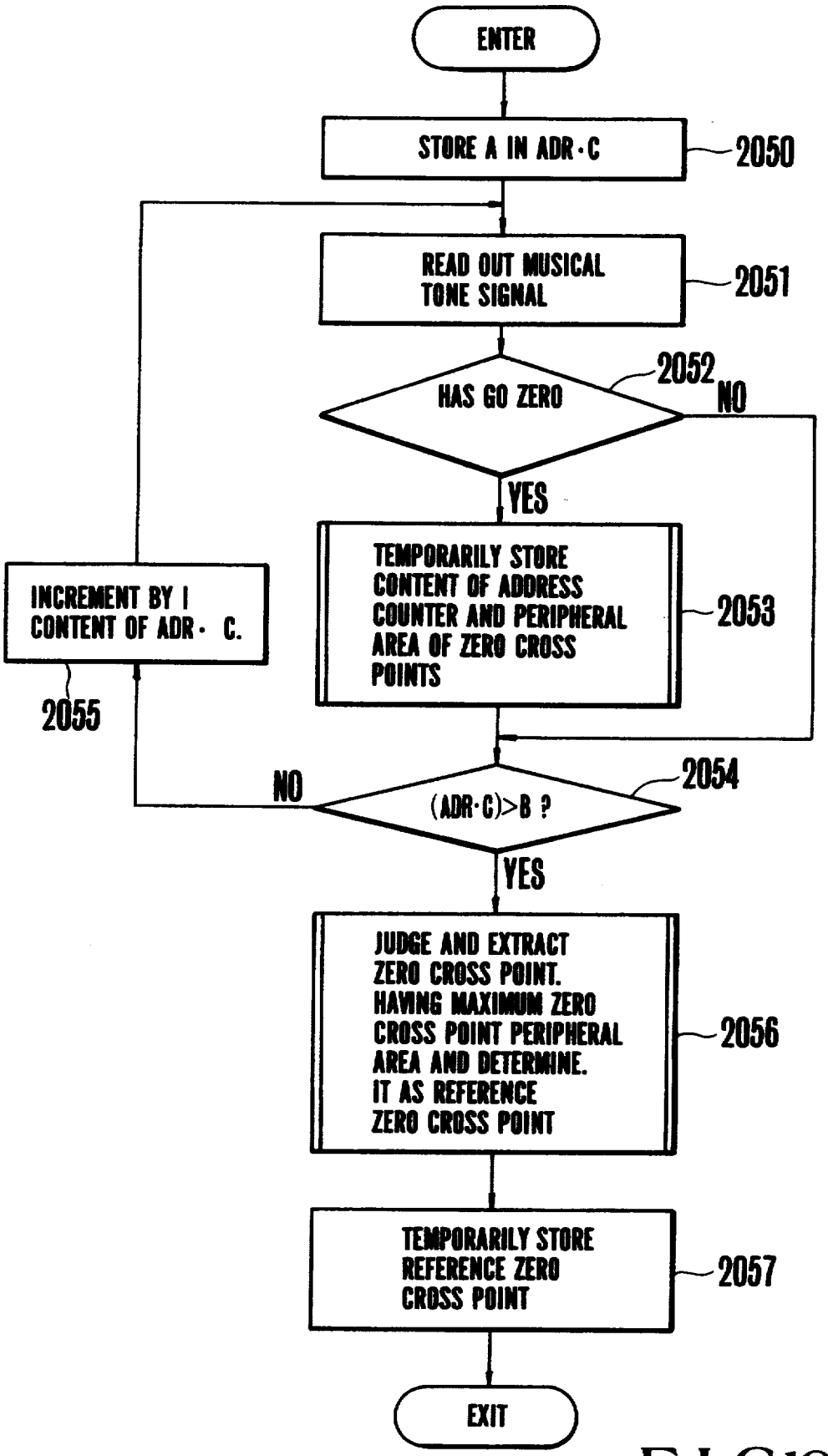
Figure 11:
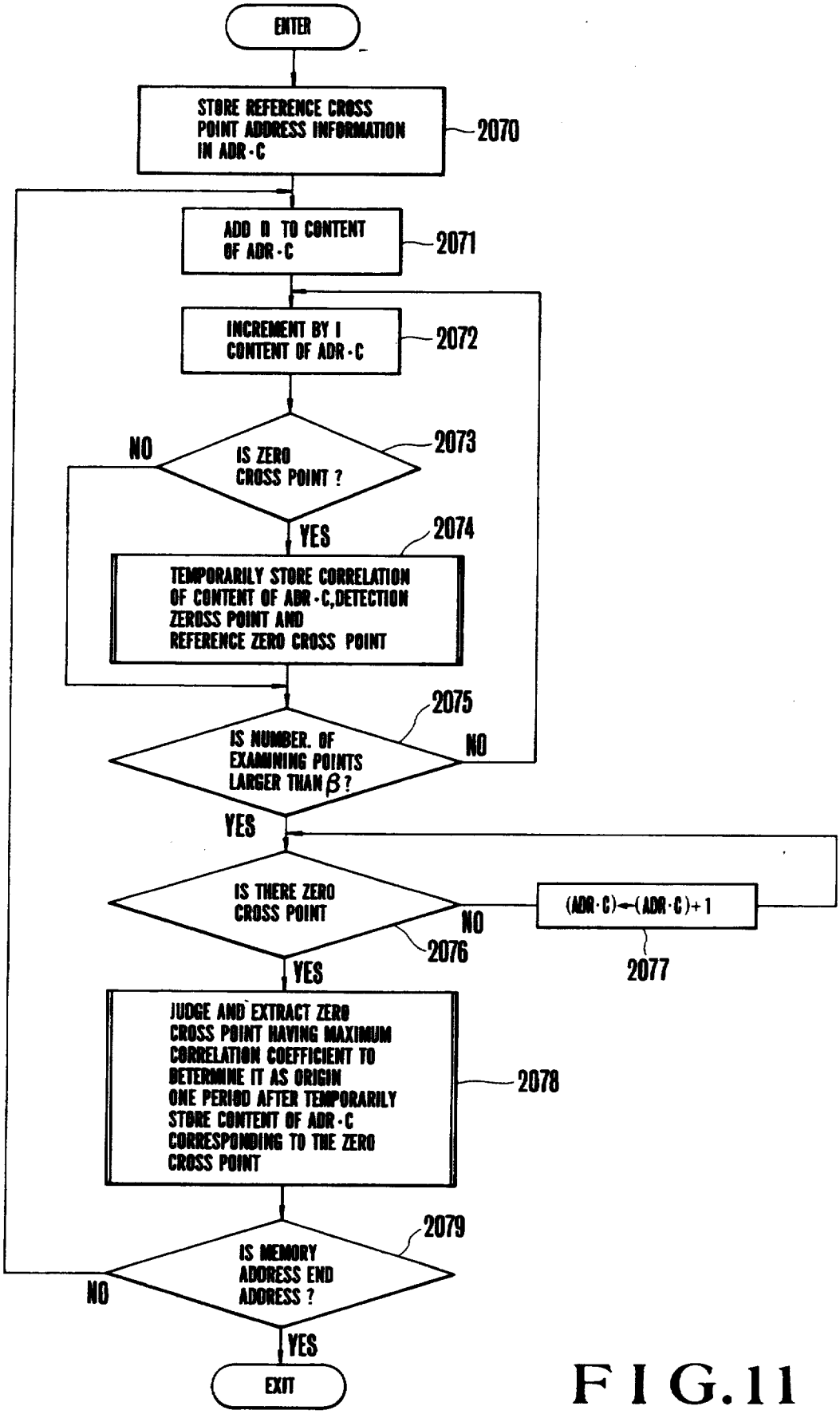

FIGS. 9 through 11 show detailed flow charts showing the detection processing of a period musical tone signal GD1 of the musical tone period detector 3.

In FIG. 9, when the operation mode of the electronic musical instrument is selected to be a period musical tone selection mode (ZXA detection mode) this mode is detected at step 2040. As shown, at step 2041, the musical tone period detector 3 proceeds to the execution of a reference ZXA detection routine in which a reference period musical tone signal GD1m used as a reference for detecting respective period musical tone signals in the entire interval of the musical tone signal. In other words, a reference position going zero cross sampling point is set. The at step 2041 positive going zero cross sampling points corresponding to the origin portions of respective period musical tone signals GD1 one, two and three periods before are detected by using the reference positive going zero cross sampling point as a detection reference. As above described, the detection processing of respective positive going zero cross sampling points corresponding to the origins of respective period musical tone signals towards the build-up portion of the musical tone is executed. During this detection processing, when an address information successively set out from the musical tone period detector 3 to the musical tone data memory device 1 reaches a value designating a start address at step 2043 a judgement is made as to whether the memory address is the starting address or not and when the result of the judgement is YES, the program is advanced to step 2044 and 2045 positive going zero cross sampling points corresponding to the origins of respective period musical tone signals GD1, one, two, 3 . . . periods after are sequentially detected by using the reference positive going zero cross sampling point as the detection reference until the end portion is reached. In this manner, the positive going zero cross sampling points corresponding to the origins of respective period musical tone signals GD1 are detected and the origin address informations representing the addresses of the musical tone memory device 1 corresponding to respective positive going zero cross sampling points are stored in the period address memory device 4 as period address informations ZXA.

FIG. 10 is a flow chart showing in more detailed the reference ZXA detection routine.

In FIG. 10, at step 2050, an address information A showing one end of an address area E storing the musical signal GD corresponding to the stable portion of the input musical tone applied from outside is stored in an address counter ADR·C in the musical tone detector 3.

Then, at step 2051 a musical tone signal GD from a corresponding address of the musical tone data memory device 1 is read out in accordance with the content of the address counter ADR·C. At step 2052 a judgement is made as to whether the musical tone signal GD read out from the musical tone data memory device 1 corresponds to a zero amplitude value or not. When the result of judgement is NO, at step 2054 a judgement is made as to whether the content of the address counter ADR·C is larger than the address information B representing the other end of the address area E or not. If (ADR·C)≦B, the content of the address counter ADR·C is incremented by +1 at step 2055 so as to return the program to the step 2051, thereby reading out a new musical tone signal GD from a corresponding address of the musical tone data memory device 1 in accordance with a new content of the address counter ADR·C. At step 2052 a judgement is made again as to whether the new musical tone signal GD corresponds to the zero amplitude value or not. If the result is YES, i.e., if an address designated by the content of the address counter ADR·C corresponds to a positive going zero cross sampling point, the content of the address counter ADR·C at this time and the peripheral area value S of the musical signal GD in a region of $\pm\alpha$ about the positive going zero cross sampling point are stored temporarily. Upon completion of this processing, at the next step 2054 a judgement is made as to whether the content of the address counter ADR·C is larger than an address information B representing the other end of address area E.

If (ADR·C)$\leqq$B, the content of the address counter ADR·C is incremented by 1 at step 2055 and the program is returned to the step 2051, thereby reading out a new musical tone signal GD from an address corresponding to the musical tone data memory device 1 according to the new content of the address counter ADR·C. Again, at step 2052 a judgement is made as to whether the new musical tone signal GD corresponds to the zero amplitude value or not.

In this manner, all positive going zero cross sampling points in the address region E are detected and when a zero cross sampling point address information representing an address of the musical tone data memory device 1 corresponding to that positive going zero cross sampling point and the peripheral area value S corresponding thereto are temporarily stored, at step 2056 a positive going zero cross sampling point showing the maximum peripheral area value is extracted from the peripheral area values S regarding respective positive going zero cross sampling points. The positive going zero cross sampling point thus extracted is used as a reference zero cross sampling point during the entire interval of the musical tone signal to temporarily store a reference zero cross sampling point address information corresponding thereto, and the positive going zero cross sampling points of the origin portions of respective period musical tone signals GD1 one, two . . . periods before or one, two . . . periods after are successively detected in accordance with the reference zero cross sampling point address information thus stored temporarily.

FIG. 11 is a flow chart showing in more detail the ZXA detection routine one period after step 2044 shown in FIG. 9.

In FIG. 11 at step 2070 the reference zero cross point address information is stored in the address counter ADR C as an initial value.

Figure 5:
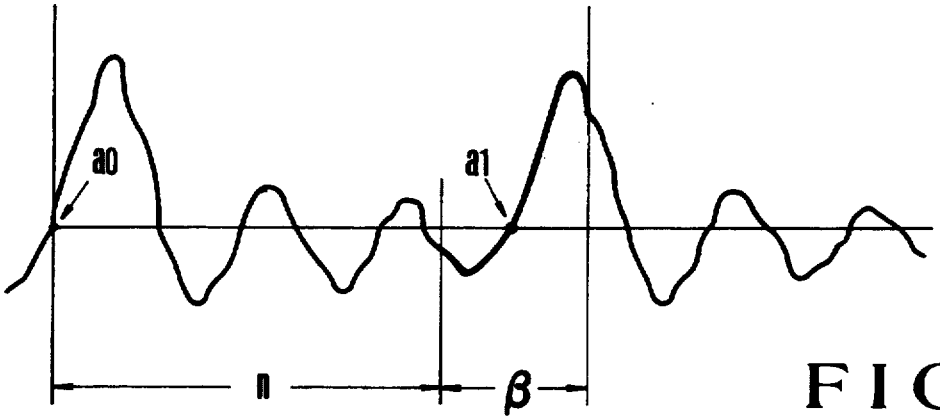

Then at step 2071, a constant n is added to the content of the address counter ADR·C, the constant n corresponding to the number of the sampling points n in the waveform shown in FIG. 5. Then at step 2072, the content of the address counter ADR·C is incremented by +1 and the musical tone signal is read out from a coresponding address of the musical tone data memory device 1 in accordance with the content of the address counter ADR·C so as to judge whether the musical tone signal GD corresponds to the zero amplitude value or not at the next step 2073. If the result of judgement is NO, at step 2075, a judgement is made as to whether the number of the examining points is larger than $\beta$ or not, the $\beta$ corresponding to the number of sampling points $\beta$ in the waveform shown in FIG. 5.

When the result of judgement made at step 2075 is that "the number of sampling points $\leqq\beta$", the content of the address counter ADR·C is incremented by +1 at step 2072 to read out a new musical tone signal GD in accordance with the new content of the address counter ADR·C. Then at step 2073, a judgement is made as to whether the new musical tone signal GD corresponds to the zero amplitude value or not. If the musical tone signal corresponds to a positive going amplitude value, the content of the address counter ADR·C at this time is temporarily stored, and the correlation coefficient between a musical tone signal during a predetermined interval −t -to +t about that positive going zero cross sampling point, and a musical tone signal (reference musical tone signal GD1m) during the predetermined interval −t to +t about the reference positive going zero cross point detected at the previous step 2041 (FIG. 9) is determined. A correlation coefficient thereof is temporarily stored. Upon completion of this processing, a judgement is made as to whether the number of examining points has exceeded $\beta$ or not at the next step 2075. If "the number of examining points $\leqq\beta$" the content of the address counter ADR.C is incremented by +1 at step 2072 and thereafter the judging processing of step 2073 is executed again.

As above described, the positive going zero cross sampling points are successively detected in an interval "$+\beta$" apart from the reference zero cross sampling point by +n and at the next step 2076, a judgement is made as to whether a positive going zero cross sampling point exists in the interval $+\beta$ or not. If the result is YES, at the next step 2078, a positive going zero cross sampling point having the maximum correlation coefficient is exracted from the correlation coefficients stored in the processing made at step 2074, to set the extracted positive going zero cross sampling point as the origin one period after. If the result of judgement at step 2076 is NO, the content of the address counter ADR.C would be successively incremented until a positive going zero cross sampling point is detected at step 2077. In this case, the firstly detected positive going zero cross sampling point is set as the reference point one period after.

In this manner, a positive going zero cross sampling point corresponding to the origin of a period musical tone signal one period after is firstly set. Then for the purpose of setting a positive going zero cross sampling point corresponding to the origin of a period musical tone signal one period after, at step 2079 a judgement is made as to whether an address information $A3_{RW}$ for the musical tone data memory device 1 corresponds to the rear end address or not. If the rear end address is not yet reached, at step 2071, the constant n is added to the present content of the address counter ADR.C Then a positive going zero cross sampling point corresponding to the origin of the period musical tone signal GD1 two periods after is set in the same manner as above described in accordance with the new content of the address counter ADR C. This processing is successively repeated until the address information $A3_{RW}$ for the musical tone data memory device 1 reaches the rear end address. By the processing described above, positive going zero cross sampling points corresponding to the origin of respective period musical tone signals GD1 one, two, three . . . periods after the reference positive going zero cross sampling point are successively set. The processing of the ZXA detection routine one period before executed at step 2042 shown in FIG. 9 is executed in the same manner. As a consequence, it will not be described.

As above described, respective period musical tone signals GD1 are detected, and when the addresses of the musical tone data memory device 1 in which the origins of the hperiod musical tone signals GD1 are stored in the period address memory device 4 as the period address information ZXA, the operation mode of the electronic musical instrument is set to the performance mode by the mode switch OP.SW Read Address Information Generator 8

Figure 12:
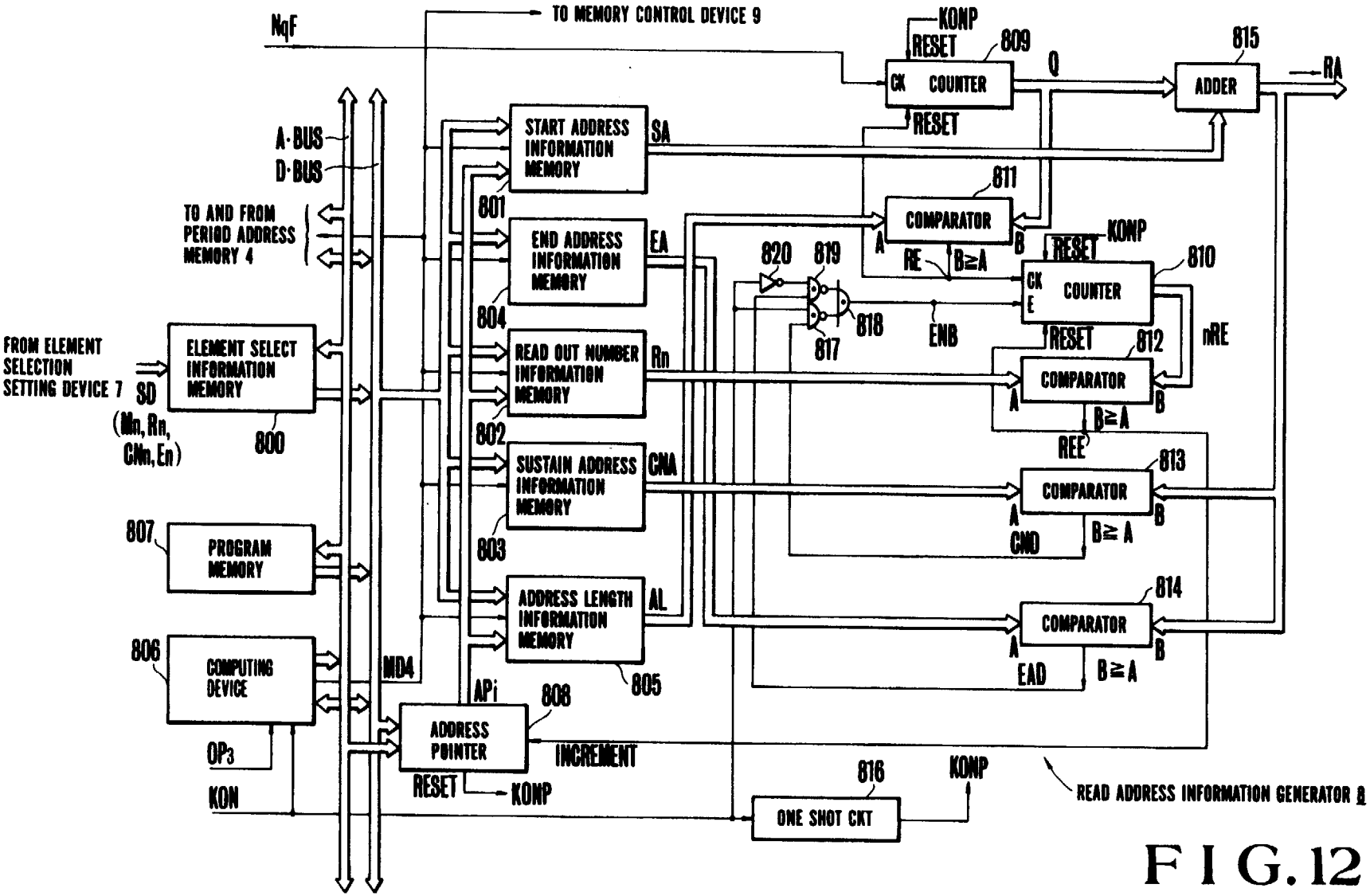
FIG. 12 is a block diagram showing one example of a read address information generator.

As shown in the block diagram shown in FIG. 12, the read address information generator 8 comprises a selection information memory device 800, a start address information memory device 801, a read out number information memory device 802, a sustain address information memory device 803, an end address information memory device 804, an address length information memory device 805, a computing device 806, a program memory device 807, an address pointer 808, counters 809 and 810, comparators 811, 812, 813 and 814, an adder 815 and a one shot circuit 816 which are interconnected as shown to operate as follows.

Above described serial number information $M_n$, repeating read number information $R_n$, sustain serial number information $CN_n$ and end number information $E_n$ which are set by the selection setting device 7 and acting as the selection informations are inputted to the selection information memory device 800 to be stored therein. The informations $M_n$, $CN_n$ and $E_n$ among the informations $M_n$, $R_n$, $CH_n$ and $E_n$ stored in the selection information memory device 800 are converted into period address informations ZXA [$M_n$], ZXA [$CN_n$] and ZXA [$E_n$] representing the addresses of the musical tone data memory device 1 respectively storing corresponding period musical tone signals GGD1 and the converted address informations ZXA[$M_n$], ZXA [$CN_n$] and ZXA [$E_n$] are stored in the start address information memory device 801, the sustain address information memory device 803, and the end address memory device 804 respectively as a start address information SA, sustain address information and an end address information EA. The conversion of the informations $M_n$, $CN_n$ and $E_n$ is executed in the computing device 806.

The repeat number information $R_n$ is directly transferred to the read out number information memory device 802 to be stored therein. In this embodiment, the selection information memory device 800, the start address information memory device 801, the read number information memory device 802, the sustain address information memory device 803, the end address information memory device 804, the address length information memory device 805 are constructed as input/output devices of the computing device 806.

When supplied with a performance mode signal OP3 from the mode switch OP.SW the computing device 806 firstly reads out the sustain serial number information $CN_n$ and the end number information $E_n$ among various selection informations CD stored in the selection information memory device 800 to detect period address informations ZXA [$CN_n$] and ZXA [$E_n$] corresponding to these informations $CN_n$ and $E_n$ according to the content of the period address memory device 4 whereby the period address information ZXA [$CN_n$] and ZXA [$E_n$] thus detected are transferred and stored in the sustain address information memory device 803 and the end address information memory device 804, (each having a one word construction) via a data bus line D-BUS as a sustain address information CNA and an end address information EA. Then the computing device 806 reads out a serial number information $M_n$ and a repeating read number information $R_n$ for the selection information memory device 800 at each order of reading out the period musical tone signals GD1. The repeating read number information $R_n$ is transferred directly to the read number information memory device 802 via the data bus line D.BUS, whereas the serial number information $M_n$ is used to detect a period address information ZXA [$M_n$] corresponding thereto according to the content of the period address memory device 4, and the detected information ZXA [$M_n$] is transferred to the start address information memory device 801 over the data bus line D.BUS as the start address information SA. At this time, the computation device 806 transfers to an address pointer 808 address informations representing write addresses of these write informations ($R_n$, SA) through the data bus line D.BUS to cause the address pointer 808 to output these address informations as an control address information APi. Then in the addresses of the start address information memory device 801 and read out number information memory device 802 designated by the control address information APi are stored the start address information SA and the repeating read out number information $R_n$ respectively.

In this embodiment, the period address memory device 4 is constructed such that it can be accessed from both the computation device 806 and the period musical tone signal detector 3. Where the computation device 806 detects the period address information ZXA [$M_n$], ZXA [$CN_n$] and ZXA [$E_n$] respectively corresponding to informations $M_n$, $CN_n$ and $E_n$, the computation device firstly sends a mode control signal MD4 of "0" to the period address memory device 4 to turn the same to a read mode. Then a sustain serial number information $CN_n$ stored in the selection memory device 800 is read out and an information $CN_n+1$ formed by adding $+1$ to the sustain serial number information is applied to the period address memory device 4 through the address bus line A.BUS as a read out address information $A4_R$. Then a period address information ZXA [$CN_n+1$] corresponding to the information $CN_n+1$ would be read out from the period address memory device 4. In other words, the information ZXA [$CN_n+1$] representing an address of the musical tone data memory device 1 storing the end portion of the period musical tone signal corresponding to the sustain serial number information $CN_n$ is read out from the period address memory device 4. The information ZXA [$CN_n+1$] thus read out is transferred to and stored in the sustain address memory device 803 as the period address information ZXA [$CN_n$]. Then the computating device 806 reads out an end number information En stored in the selection information memory device 800 and then supplies to the period address memory device 4 an information $E_n+1$ obtained by adding $+1$ to the information $E_n$ as a read address information $A4_R$. Then an information ZXA [$E_n+1$] representing an address of the musical tone data memory device 1 storing the end portion of the period musical tone signal GD1 corresponding to the end number information $E_n$ is read out from the period address memory device 4. The information ZXA [$E_n+1$] thus read out is transferred to the end address information memory device 804 as the period address information ZXA [$E_n$].

The reason that the informations $CN_n+1$ and $E_n+1$ respectively obtained by adding +1 to the informations $CN_n$ and $E_n$ are supplied to the period address memory device 4 as address informations lies in that the period address information ZXA stored in the memory device 4 corresponding to a memory address of the end portion of each period musical tone signal GD1 and that the memory addresses for the end portions of the period musical tone signals respectively designated by the informations $CN_n$ and $E_n$ correspond to the memory addresses of the origins of the period musical tone signals GD1 of the next period.

When the detection of the period address informations ZXA $[CN_n]$ and ZXA $[E_n]$ is finished above described, the computation device 806 reads out from the selection information memory device 800 a serial number information $M_n$ at each other of read out and the read out information $M_n$ is applied to the period address information device 4 as a read address information $A4_R$. Accordingly, a period address information ZXA $[M_n]$ corresponding to information $M_n$ is read out from the period address memory device 4, and the read out period address information ZXA $[M_n]$ is transferred to and stored in the start address information memory device 801 as a start address memory information SA.

When the writing processing of various informations into the memory devices 801–804 completes, the memory address length of the musical tone data memory device for the period musical tone signal GD1 designated by the serial information $M_n$ is detected in accordance with the content of the period address memory device 4. In other words, in this embodiment, the period address information ZXA represents the address of the musical tone data memory device in which the origin of the period musical tone signal GD1 has been stored as above described. Consequently, in order to read out a desired period musical tone signal GD1 from the musical tone data memory device 1 it is necessary to know the memory address length together with the origin address of the period musical tone signal GD1. Then, the computing device 806 reads out a period address information regarding a next period address musical tone signal GD1 succeeding the period musical tone signal GD1 corresponding to the serial number information $M_n$ stored in the selection information memory device 800. This read out processing is executed by adding +1 to the serial number information $M_n$ and then applying the sum $M_n+1$ to the period address memory device 4 as the read out address information $A4_R$. Consequently, it is possible to know the period address information ZXA $[M_n+1]$ of the period musical tone signal GD1 stored in the next address and by calculating the difference between this information ZXA $[M_n+1]$ and the period address information ZXA $[M_n]$ corresponding to the serial number information $M_n$ it is possible to know the memory address length of the musical tone data memory device 1 for the period musical tone signal GD1 corresponding to the information $M_n$. The memory address length information AL for the period musical tone signal corresponding to the information $M_n$ thus detected is transferred to the address length information memory device 805 through the data bus line D.BUS and stored in an address of the memory device 805 designated by the control address information APi outputted from the address pointer 808. The start address information SA, the repeating read number information SA, the repeating read number information $R_n$ and the address length information AL regarding the same order of read out are respectively stored in the addresses of the start address information memory device 801, read out number information memory device 802 and the address length memory information memory device 805 which are designated by the same control address information APi. Above described processing is executed by a program stored in the program memory device 807.

Upon completion of the processing described above, as a key of the keyboard is depressed, the key switch circuit 5 produces a key-on signal KON whereas the phase angle information generator 6 produces a phase angle information NqF corresponding to the tone pitch of the depressed key. Then the key-on signal KON is supplied to the computing device 806 as a performance start command signal, whereby the computing device 806 is rendered inoperative so that the address control for the start address information memory device 801, the read out number information memory device 802, and the address length information memory device 805 is shifted to the address pointer 805. On the other hand, the key-on signal KON is supplied to the one shot circuit 816 as a trigger signal whereby the one shot circuit 816 produces a key-on pulse KONP of a narrow pulse width. This key-on pulse KONP is applied to the address counter 805 and the counters 809 and 810 as a reset signal to reset the address pointer 805 and the counters 809 and 810. Under these conditions, when the phase angle informations NqF are sequentially supplied to the clock input terminal CK of the counter 809, this counter counts the number of the phase angle informations NqF for producing a stepping information Q (Q=1, 2, 3 . . . ) which successively increases with the period of the phase angle information NqF at the output terminal. The address pointer 808 is reset by the key-on pulse KONP to produce a control address information APi of "0" which designates read out of the informations stored in the address of the memory devices 801 and 802. Accordingly, where the contents of these memory devices 801, 802 and 805 at each order of reading out the period musical tone signals can be shown in the following Table 5, the start address information memory device 801 produces a start address information SA of "1275", the read out number information memory device 802 produces a repeating read out number information $R_n$ of "3" and the address length information memory device 805 produces an address length information AL of "253". On the other hand, the sustain address information memory device 803 produces a sustain address information of "4572", while the end address information memory device 804 produces an end address information EA of "7597".

TABLE 5

| read out order | SA | AL | $R_n$ | Remarks | CNA | EA |
|---|---|---|---|---|---|---|
| 1 | 1275 | 253 | 3 | APi = 0 | 4572 | 7597 |
| 2 | 2296 | 260 | 4 | = 1 | | |
| 3 | 2556 | 261 | 4 | = 2 | | |
| . | . | . | . | . | | |
| . | . | . | . | . | | |
| . | . | . | . | . | | |
| 10 | 4317 | 255 | 2 | = 9 | | |
| . | . | . | . | . | | |
| . | . | . | . | . | | |
| . | . | . | . | . | | |
| 20 | 6817 | 258 | 3 | = 19 | | |
| 21 | 7075 | 260 | 2 | = 20 | | |
| 22 | 7335 | 262 | 5 | = 21 | | |

The start address information SA of "1275" among the informations SA, $R_n$, AL, CNA and EA thus read out is applied to adder 815 to be added to the stepping information Q produced by the counter 809. The sum SA+Q obtained by the adder 815 is outputted as a read out address information RA which gradually increases as the stepping information Q increases gradually starting from the initial value of "1275".

The address length information AL having a value of "253" and read out from the address length information memory device 805 is inputted to the comparator 811 where it is compared with the stepping information Q coming from the counter 809 to determine whether Q=AL or not. In other words, a check is made as to whether the period musical tone signal GD1, the address of its origin being designated by the start address information SA, has been read out up to the end portion thereof or not. Where Q=AL, one period read out completion signal RE is produced from an output terminal B≦A of the comparator 811. This one period read out completion signal RE is applied to the counter 809 as a reset signal and to the counter 810 as a count input. Accordingly, the counter 809 that produces the stepping information Q is reset thereby outputting the stepping information Q which gradually increases from "0" with the period of the phase angle information NqF. Consequently, the adder 815 produces a second read out address information RA whose initial value is the start address information SA having a value of "1275". On the other hand, the counter 810 is counted up by the one period read out completion signal RE supplied from the comparator 811 to produce a present number of read out informations nRE of "1" from its output terminal. This present number of read out informations nRE is supplied to the comparator 812 to be compared with a repeating number information $R_n$ read out from the read out number information memory device 802. Where $R_n$=nRE, it is judged that the period musical tone signal GD1 whose origin has been designated by the start address information SA has been read out by a number of times designated by the repeating read out number information $R_n$, whereby the comparator 812 produces a designated number read out completion signal REE from its output terminal B≦A. However, as shown in Table 5, where the repeating read number information $R_n$ regarding the period musical tone signal GD1 designated by the start address information SA having a value of "1275" is set as $R_n$=3, no designated completion signal REE would be produced until reading out of the period musical tone signal GD1 designated by the start address information SA having a value of "1275" has been made three times. Thereafter, when the third read out address information designated by the start address information REE having a value of 1275 amounts to RA=AL, the comparator 811 would produce a third one period read out completion signal RE. Accordingly, the read out number present value information nRE produced by the counter 810 becomes "3" with the result that the comparator 812 would produce a designated number read out completion signal information REE which is supplied to the address pointer 808 as an increment signal and also to the counter 810 as a reset signal. As a consequence, the counter 810 is reset and the content of the address pointer 808 is incremented to produce a new control address information APi of "1". In the same manner as above described, thereafter a read address information RA is produced for reading out a period musical tone signal GD1 designated by a start address information SA having a value of "2296" (see Table 5) at the second order of read out.

As above described, a read address information RA is read out from the musical tone data memory device 1 for reading out a period musical tone information GD1 designated by a start information SA at each order of reading. Thereafter, when the read out information RA coincides with a sustain address information CNA, comparator 813 produces a sustain address arrival detection signal CND from its output terminal B≦A.

This sustain address arrival detection signal CND is inputted to a NAND gate circuit 817. But when a key-on signal KON of 1 is being produced by the key switch circuit 5 at the time when the sustain address arrival detection signal CND is produced, that is when any one of the keys is being depressed, the NAND gate circuit 817 is enabled to produce an output "0" whereby the enabling signal ENB of "0" of the AND gate circuit 818 would be applied to the enabling signal input terminal E of the counter 810. As a consequence, the counter 810 is prohibited from counting until the NAND gate circuit 817 is disenabled, that is the key-on signal KON becomes "0" due to key release. In other words, during depression of a key, when the read address information RA coincides with the sustain address information CNA, the counting operation of the counter 810 would be stopped until the key is released. For this reason, the content of the counter 810 would not step regardless of the application of the one period read out completion signal RE thus preventing the comparator 812 from sending out a designated number read out completion signal REE acting as an increment signal for the address pointer 808 until the key is released. For this reason, a read address information RA for a period musical tone signal GD1 designated by the start address information SA at a given order of read out would be repeatedly produced for many times until the key is released.

Thereafter, when the key is released, the output of the NAND gate circuit 817 becomes "1" and the AND gate circuit 818 produces an enabling signal ENB of "1" to reset the counter 810 to the operable state. When its count, i.e., the present number of read out informations nRE, coincides with a repeating read number information $R_n$ at the given order of read out, the comparator 812 would produce a designated number read out completion signal REE to increment the content of the address pointer 808. Thus, in the same manner as above described, a read address information RA for reading out a period musical tone signal GD1 designated by a start address information SA at a new order of read out would be formed. When the key is released before coincidence of the read address information RA with the sustain address information CNA, the output of the NAND gate circuit 817 still remains at "1" (i.e., not changed to "0") with the result that the read address information RA is formed according to the start address information SA at each subsequent order of read out, and the repeating read number information RA. Thus, the provision of the sustain address information CNA is effective to prolong the sustain portion of the musical tone while a key is being depressed.

Thereafter, when the read address information RA coincides with the end address information EA, the comparator 814 would produce an end address arrival detection signal EAD.

While this end address arrival detection signal EAD is inputted to the NAND gate circuit 819, if at this time the output signal $\overline{KON}$ of an inverter 820 supplied to one input of the NAND gate circuit 819 is "1", that is when the key is released, the NAND gate circuit 819 would be enabled to produce an output 0 whereby an AND gate circuit 818 applies a "0" enabling signal ENB to the enabling signal input terminal E of the counter 810. Accordingly, the content of the counter 811 would not be stepped even when the comparator 811 produces a one period read out completion signal RE so that the start address information would not be updated to that of a new order of read out and the adder 815 repeatedly produces a number of read address informations RA for reading out a period musical tone information GD1 designated by a start address information SA at an order of read out which arrived at the end address information EA. This repeat operation is continued until a key-on signal KON is formed by a newly depressed key is applied.

When the read address information RA formed in a manner as above described is supplied to the musical tone data memory device 1 as an address information $A1_{RW}$, respective period musical tone signals GD1 designated by the selection information SD are sequentially read out from the musical tone data memory device 1 and these sequentially read out period musical tone signals GD1 are converted into corresponding analogue musical tone signals GA by a digital to analog converter 100 of the tone producing device 10. These musical tone signals GA are then subjected to a desired envelope control and produced through a loudspeaker 102 to obtain a musical tone having a complicated tone color corresponding to the selection information SD.

While in this embodiment, the circuit is constructed such that a serial number information Mn corresponding to a desired period musical tone signal GD1, a repeating read number information $R_n$ of the period musical tone signal GD1 designated by the information $M_n$, a sustain serial number information $CN_n$ and an end information $E_n$ which designate period musical tone signals respectively corresponding to the sustain portion and the end portion of the produced musical tone are set and applied, where the same serial number information $M_n$ is set for a plurality of orders of read out, a musical tone can be produced similar to that produced when a repeating read number information $R_n$ is set.

So long as the lengths of the sustain and end portions of the produced musical tone are fixed, it is not necessary to specify the sustain serial number information $CN_n$ and the end number information $E_n$ since these informations are set by the serial number information $M_n$ and the repeating read number information $R_n$.

D. Modification of the Musical Tone Period Detector

The electronic musical instrument according to this invention is constructed to successively designate a desired period musical tone signal GD1 by a method of designating described above for reading out the signals GD1 from the musical tone data memory device 1. In other words, a plurality of period music tone signals GD1 which have been continuously stored in the musical tone data memory device 1 are read out discontinuously. Such discontinuous read out do not affect the continuity of the period musical tones themselves, but noise is caused by phase shifts among various harmonic components. More particularly, where a period musical tone signal $GD1_A$ corresponding to a waveform as shown in FIG. 13a is read out, then a period musical tone signal $GD1_B$ corresponding to a waveform as shown in FIG. 13b is read out., and when these two signals are connected together these signals $GD1_A$ and $GD1_B$ are continuously interconnected because them-musical tone signal amplitudes at the start and end of respective period musical tone signals GD1 are always at a substantially zero level.

Figure 13:
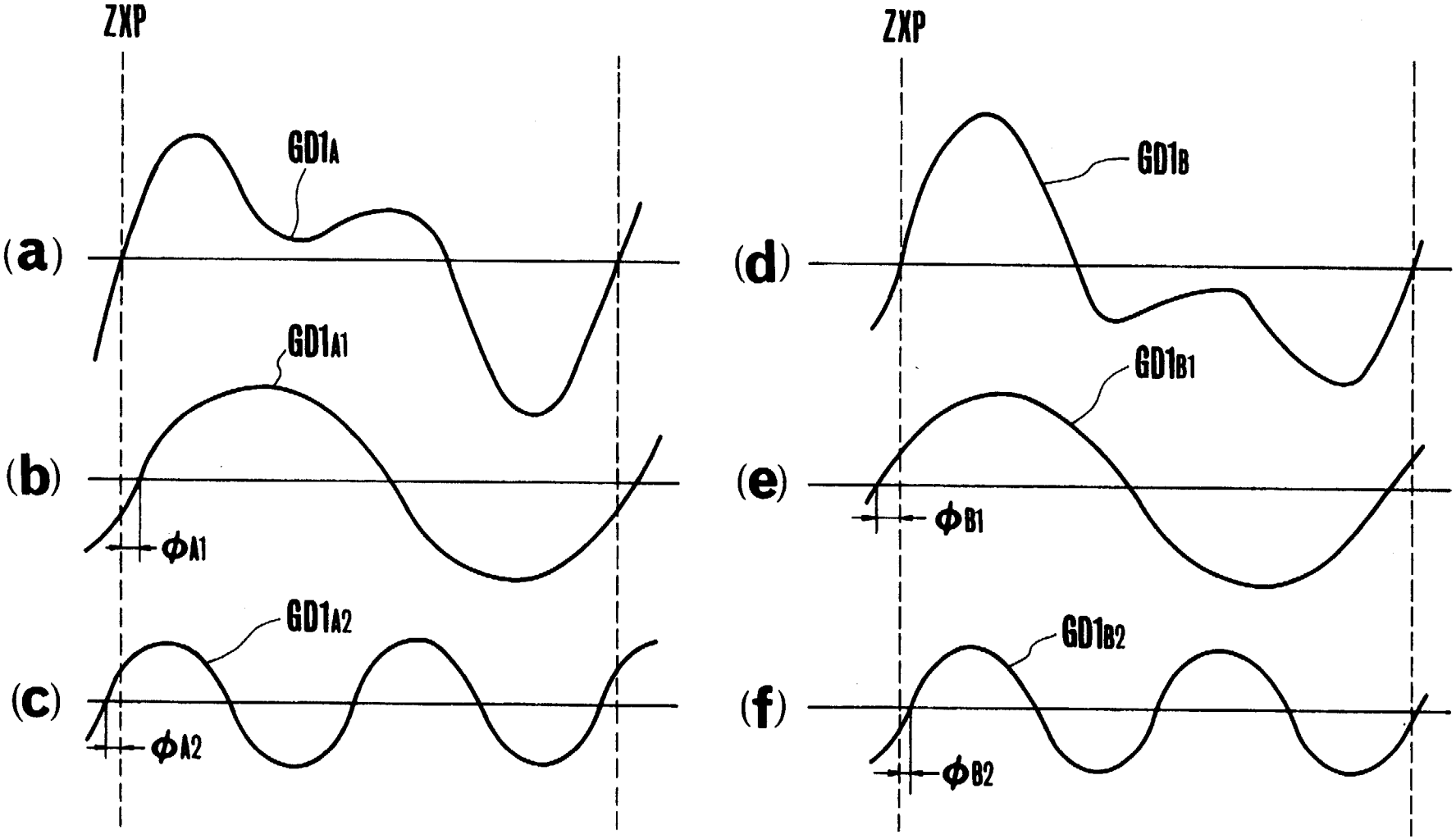
FIGS. 13 and 14 show waveforms useful to explain why harmonic wave component phases should be aligned.
Figure 14:
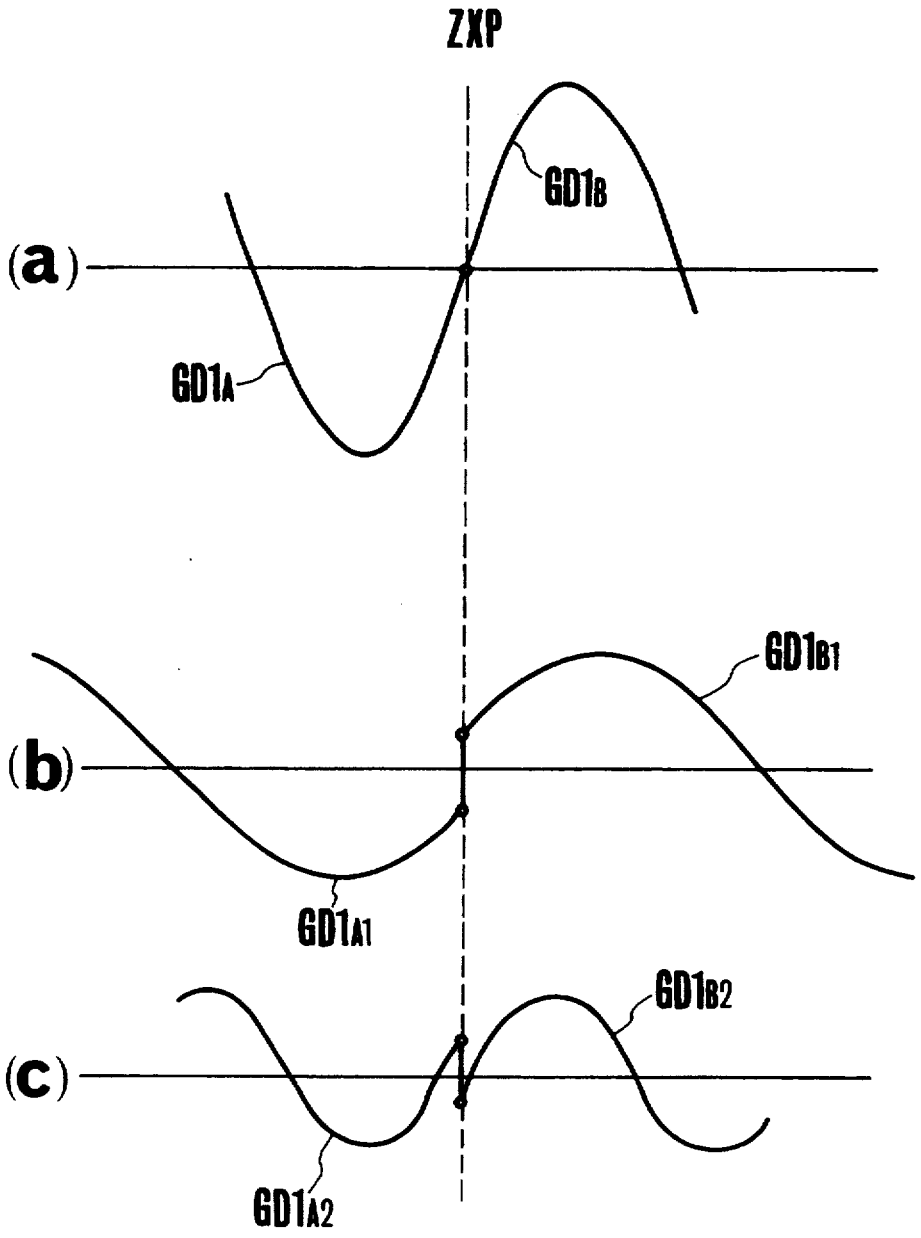

However, as shown in FIGS. 13a and 13b the fundamental wave component $GD1_{A1}$ (first harmonic component) and the second harmonic component $GD1_{A2}$ which constitute a period musical tone signal $GD1_A$ are respectively dephased by $\phi_{A1}$ and $\phi_{A2}$ with respect to the origin or start point ZXP. In the same manner, the fundamental wave component $GD1_{B1}$ and the second harmonic component $GD1_{B2}$ constituting another period musical tone signal $GD1_B$ are also dephased by $\phi_{B1}$ and $\phi_{B2}$ respectively with respect to the origin ZXP as shown in FIGS. 13e and 13f respectively. Accordingly, where the two period musical tone signals $GD1_A$ and $GD1_B$ are connected together, due to the phase differences with respect to the origin ZXP, the fundamental wave components $GD1_A$ and $GD1_B$ would be interconnected as shown in FIG. 14b and the second harmonic components $GD1_{A2}$ would also be interconnected as shown in FIG. 14c for the same reason. Thus respective harmonic components are interconnected discontinuously, thus causing unwanted noise.

According to this modified embodiment, for the purpose of eliminating such noise the following performance is added to the musical tone period generator 3. More particularly, a Ferie series development of each period musical tone signal GD1 is made according to the following equation (1) to obtain coefficients ai and bi of the sine wave component and the cosine wave component of respective harmonic orders i=1 to m.

$$f(t) = \sum_{i=1}^{m} (a_i \sin\theta i + b_i \cos\theta i) \tag{1}$$

As is well known in the art the term (ai sin $\theta$+Bi cos $\theta$) can be expressed as $\sqrt{ai^2+i^2}\,(\theta i+\phi i)$; where $$\phi i = \tan^{-1}\frac{bi}{ai}.$$

Expressing equation (1) with sine terms alone by utilizing this relationship and neglecting the phase difference $\phi$i we obtain $$f(t) = \sum_{i=1}^{m} (\sqrt{a_i^2 + b_i^2}\ \sin\theta i) \tag{2}$$

Each harmonic component is synthesized according to equation (2) by utilizing $\sqrt{ai^2+bi^2}$ as a coefficient for harmonic components (sin $\theta$i) at respective orders and the synthesized harmonic component is stored in the musical tone data memory device 1 as a new period musical tone signal GD1'. Where the respective (*first to Nth*) period musical tone signals GD1 are resynthesized as above described *with the Kth resynthesized tone signal corresponding to the Kth original tone signal* (*where N and K are positive integers and* $1 \leqq K \leqq N$), the phases of the harmonic components constituting each period musical tone signal GD1 will become the same, thus completely eliminating noise described above.

In order to execute such processing it is necessary to read out, one after one, the period musical tone signals GD1 from the musical tone data memory device 1. To this end, as shown by dotted lines in FIG. 1, the period address information ZXA stored in the period address memory device 4 are utilized.

To read out the period address information ZXA from the memory device 4, the musical tone period detector 3 applies to the memory device 4, a mode control signal MD2 of "0" and an address information $A2_{RW}$ designating the read out address. As a consequence, the musical tone period produces an address information $A3_{RW}$ corresponding to the information ZXA and a mode control signal MD3 "0" which are supplied to the musical tone data memory device 1 via the memory control device 9, whereby a period musical tone signal GD1 corresponding to the period address information ZXA is read out from the musical tone data memory device 1. This read out period musical tone signal GD1 is subjected to the resynthesizing processing described above in the detector 3 and then supplied to and stored in the musical tone data memory device 1 through the memory control device 9 as a new period musical tone signal GD1' together with the address information $A3_{RW}$(having the same content as the period musical tone signal GD1 as it is read out) and a mode control signal MD3 of "1". When the processing of a period musical tone signal GD1 is completed as above described, the processing of the next period musical tone signal GD1 is executed in the same manner such processing being repeated until the processings of all period musical tone signals GD1 being stored in the musical tone data memory device are completed. The circuit is constructed such that these processings are executed at a step following the step 2005 in the flow chart shown in FIG. 3.

E. Another Embodiment of the Period Address Memory Device 4 Memory Device 4

Figure 15:
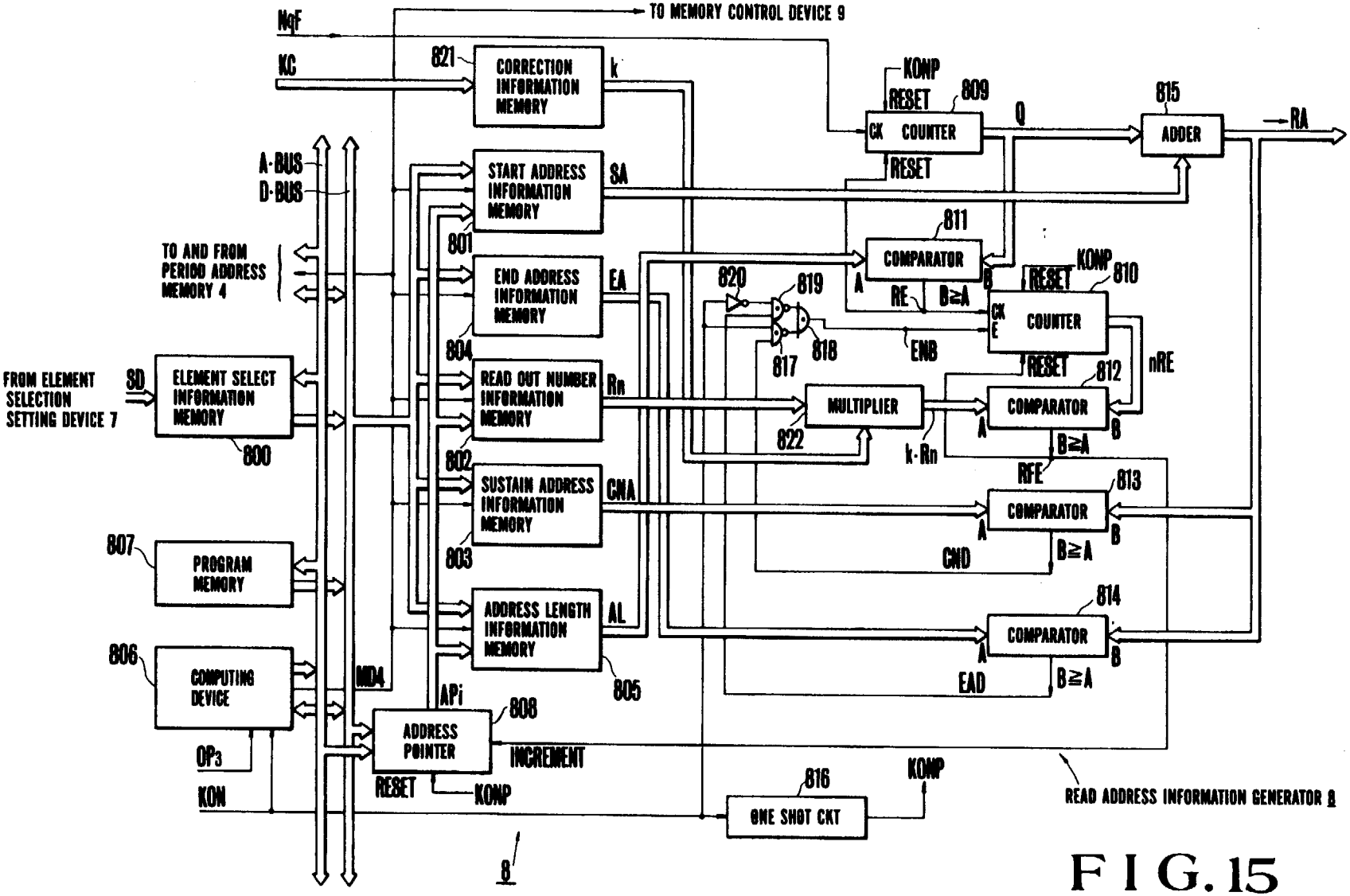
FIG. 15 is a block diagram showing a modified read address information generator.

FIG. 15 is a block diagram showing another embodiment of the read address information generator 8.

The read address information generator 8 shown in FIG. 15 is different from that shown in FIG. 12 in that it comprises a correcting information memory device 821 accessed by the key code KC to produce a correction information k corresponding to the tone pitch of a depressed key and a multiplier 822 which multiplies a repeating read number information $R_n$ outputted from the repeat number information memory device 802 by the correction information k, the product $k.R_n$ being supplied to the comparator 812 to be compared with a present read number information nRE produced by the counter 810. In other words, the repeating read number information $R_n$ is modified according to the tone pitch of the depressed key. In this case, the correction information k is set such that each value is doubled each time the octave range rises one. For this reason, even when the musical tone data memory device 1 is accessed by a read address information RA whose speed varies gradually at a twice speed, for example, a the repeating read number information $R_n$ is multiplied by a twice correction information k the period musical tone signal GD1 would be read out with a surplus corresponding to the correction information k with the result that the interval producing a musical tone can be maintained always constant regardless of the depressed key.

Another Embodiment of the Element Selection Setting Device 7 and the Read Address Information Generator 8

Figure 16:
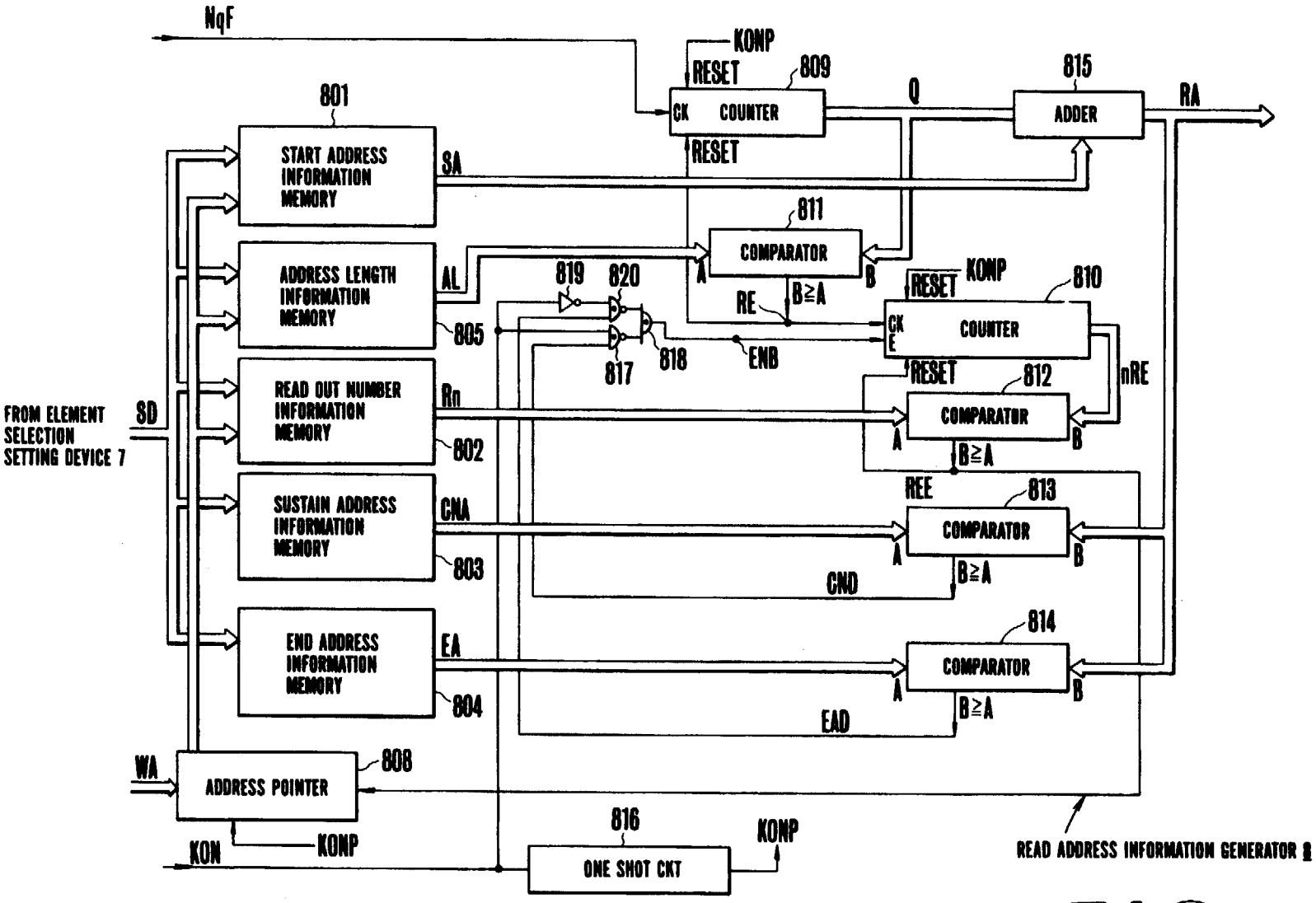
FIG. 16 is a detailed block diagram showing a selection information setting device and another modification of the read address information generator.

FIG. 16 shows another modification in which the designation of a desired period musical tone signal is effected directly by a corresponding address information where the memory positions of respective period musical tone signals GD1 stored in the musical tone data memory device 1 are already known. More particularly, different from the embodiment shown in FIG. 12, a start address information SA, an address length information AL, a repeating read number information $R_n$, a sustain address information CNA and an end address information EA are directly set and inputted. Accordingly, to read address information generator 8 of this embodiment corresponds to that shown in FIG. 12 except that the computation device 806 and the program memory device 807 are omitted.

With an electronic musical instrument according to this modification all period address information ZXA can be provided beforehand to the performer when all period address informations ZXA stored in period address memory device are printed out or displayed by a display device.

Then the performer sets the selection information SD corresponding to a desired period musical tone signal GD1 at each order of read out with a data setting keyboard of the element selection setting device 7 while observing printed letters or a list of the displayed period address informations ZXA.

In this modification, in the element selection setting device 7 are set the write address informations WA for designating the addresses for writing the selection informations according to the order of respecting read out operations, and the write address informations WA are sent to the start address memory device 801, the read out number information memory device 802, and the address length information memory device 805 as the address informations.

A signal obtained by inverting a performance mode signal $OP_3$ is applied to the musical tone data memory device 1 as a mode control signal MD4.

Advantageous effects similar to those of FIG. 12 can be obtained with the element selection setting device 7 and the read address information generator shown in FIG. 16.

G. Modifications of the Musical Tone Period Detector 3, the Element Selection Setting Device 7 and the Read Address Information 50 Generator 8

Figure 17:
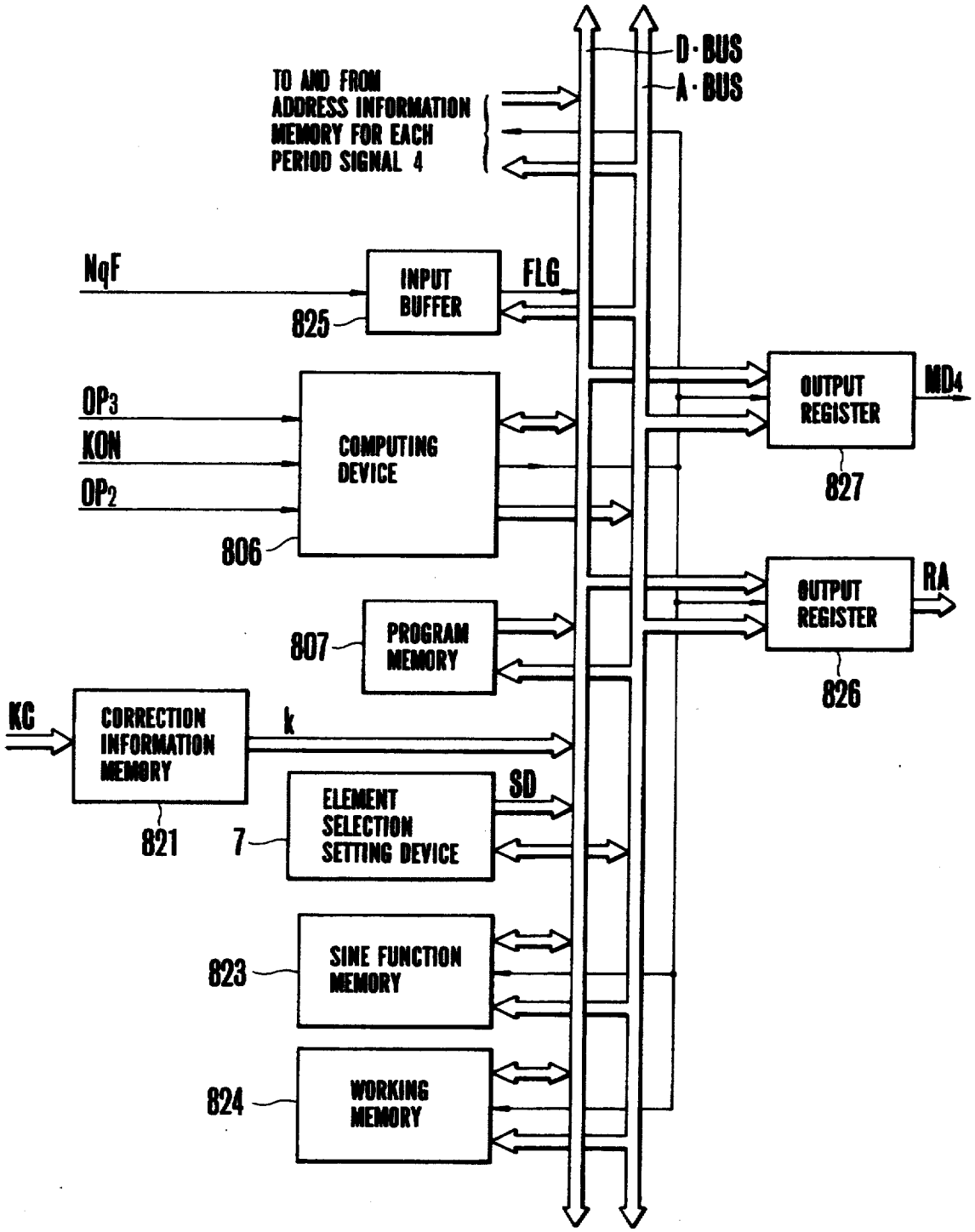
FIG. 17 is a detailed block diagram showing modified musical tone signal detector for different periods, selection information setting device and modified read address information generator.

FIG. 17 is a block diagram showing these modified devices in which various processings of the musical tone period detector 3 are executed by the computing device 806 of the read address information generator 8, and the measurement and comparison processing by the counters and comparators of the read address information generator 8 are also executed by the computing device 806.

Accordingly, in this modification such selection information SD as a start address information SA is stored in a select information memory area, whereas the counters and the address counter corresponding to the counter 809 and 810 shown in FIG. 12 are formed in a counter area in a working memory device 824. The functions of the comparators 811 to 814 are performed by a computation processing program in a computation device 806. The phase angle information NqF is applied to the computation device 806 via an input buffer 825 as a flag signal FLG which increments a counter (corresponding to the counter 809 as shown in FIG. 12) provided in the working memory device 824 for counting the number of the stepping informations. The read address information RA is transferred to an output register 826 and then supplied therefrom to the musical tone data memory device 1 via the memory control device 9. The circuit is constructed such that a mode control signal MD4 for the musical tone data memory device 1 is produced by an output register 827. There are also provided a sine function memory device 823 for effecting the Fourier series development and a correction information memory device 821 for producing a correction information k.

With the electronic musical instrument shown in FIG. 17, when the mode switch OP-SW applies a period detection mode signal $OP_2$, the computation device 806 sequentially executes processings similar to those shown in the flow charts shown in FIGS. 9 through 11 according to a computation program stored in the program memory device 807. When a performance mode signal $OP_3$ is given and selection informations SD are sequentially inputted, processings similar to those at the steps 2006 to 2011 of the flow chart shown in FIG. 3 are sequentially executed according to a computation program stored in the program memory device 807. Thereafter, when a key-on signal KON is given, operations similar to those of the embodiment shown in FIG. 15 are executed according to a program stored in the program memory device 807 thereby forming a read address information RA.

Thus, with this modification too, the same advantageous effects as those of the embodiment shown in FIG. 15 can be effected.

H. Another Embodiment of the Electronic Musical Instrument According to this Invention Although the electronic musical instruments described in the foregoing embodiments the tone producing channel was of one series type, where the tone producing channel is N ($N \geqq 2$) it is possible to designate and read out the period musical tone signals GD1 in a different manner for respective tone producing channels where the circuit is constructed in the following manner.

More, particularly, there are N each of the start address information memory device 801, the read out number information memory device 802, the sustain address information memory device 803, the end address information memory device 804, and the address length information memory device 805, corresponding to N tone producing channels. Furthermore, N period signal generators 6 are provided. Also, there are N each of the counters 809, 810 and the address pointer 808 shown in FIG. 12. The read access time for the musical tone data memory device 1 is divided into N time slots corresponding to the respective N tone producing channels, and such selection informations SD as start address informations corresponding to respective tone producing channels and the phase angle information NqF are used to form read address informations RA for respective tone producing channels in each divided time slot. The read address information RA thus formed on the time division basis is applied to the musical tone data memory device 1 as an address information. Then the period musical tone signal designated by the selection information for each tone producing channel is read out on the time division basis. In this case, the pitch of the musical tone signal in each tone producing channel is determined by the phase angle information NqF of a corresponding tone producing channel. This construction allows simultaneous generation of musical tones of a plurality of different series from the content of a single musical tone data memory device.

In the N tone producing channels, since the comparators 811 to 814 and the adder 815 shown in FIG. 12 are used on the time division basis, it is not necessary to provide N of them.

Although in the foregoing embodiments of the electronic musical instrument, a musical tone signal GD corresponding to an input musical tone coming from outside is continuously stored in the musical tone memory device 1, it is also possible to detect respective period musical tone signals GD1 out of the stored musical tone signal, to restore the period musical tone signals in predetermined memory areas and to designate a desired period musical tone signal by designating a corresponding memory area.

As above described, the invention provided a novel electronic musical instrument wherein among musical tone signals stored in a musical tone data memory device, desired period musical tone signals are sequentially designated and read out to produce a corresponding musical tone and wherein the number of repeatedly read out operations is corrected according to the tone pitch of a depressed key. Accordingly, it is possible to produce a musical tone signal having various complicated waveforms thus imparting a complicated tone color to the produced musical tone. Moreover, it is possible to maintain always constant the interval between the attack portion and the end portion of the produced musical tone regardless of the depressed key.

What is claimed is:

1. An electronic musical instrument comprising a keyboard including a plurality of keys;

a musical tone data memory device for storing a plurality of different tone waveforms constituting a musical tone to be generated;

an address designation memory device for storing information that designates starting addresses of said waveforms stored in said musical tone data memory device;

a phase angle information generator for generating a phase angle information having a period corresponding to a tone pitch of a depressed key;

selection information setting means for manually setting a selection information adapted to designate a sequence of selected ones of said starting addresses;

said selection information being programmable by means of said selection information setting means;

read out information generating means for generating readout address information for reading out sequentially each of said musical tone waveforms from said musical tone memory device according to said programmed selection information, said musical tone waveforms being successively varied according to said phase angle information; and musical tone generating means for producing a musical tone based on the musical tone waveforms read out from said musical tone data memory device according to said selection information.

2. An electronic musical instrument comprising keyboard means having a plurality of keys;

phase angle information generating means for generating a phase angle information corresponding to a depressed one of said keys;

waveform memory means for storing a plurality of different waveforms each of which comprises a plurality of sample values;

selection information setting means for establishing selection information designating waveforms to be generated among said plurality of waveforms in said waveform memory means as well as order information designating an order of generation of each of said designated waveforms, said selection information and said order information being manually programmable by means of said selection information setting means;

read out means connected to said selection information setting means and said phase angle information generating means for reading out said designated waveforms designated by said selection information in the order of generation designated by said order information from said waveform memory means, each of said designated waveforms being read out in the form of said sample values in accordance with said phase angle information;

tone generating means for generating a musical tone based on said generated waveforms; and wherein said read out means comprises read address information generating means for generating an address information in response to said selection information and said phase angle information and wherein said waveform memory means connected to said read address information generating means generates said designated waveform in accordance with said address information.

3. An electronic musical instrument according to claim 2 which further comprises a period address information memory device adapted to store leading addresses of respective waveforms stored in said waveform memory device.

4. An electronic musical instrument according to claim 2 wherein said read address information generating means comprises a start address information memory means for reading out a leading address of a waveform designated by said selection information and storing said read out leading address information;

computing means for calculating the number of addresses to be scanned in an address space from said leading address stored in said start address information memory means, and address length information memory means for storing the number of addresses to be scanned calculated by said computing means, said computing means calculating said number of addresses from a start address information in accordance with a key depression for generating a read address information in accordance with said selection signal and said phase angle information.

5. An electronic musical instrument according to claim 2 wherein said read address information generating means repeatedly reads out an output obtained by a computing device at a period determined by said phase angle information thereby generating an address information.

6. An electronic musical instrument according to claim 2 wherein said waveform memory means stores a waveform having a plurality of periods.

7. An electronic musical instrument according to claim 2 wherein said tone generating means comprises a digital-analog converter for converting a digital information read out from said waveform memory means into an analog information, an envelope control circuit responsive to a key-on signal generated when one of said keys is depressed for imparting an envelope to said analog information, and a loudspeaker for converting said analog information imparted with said envelope into a musical tone.

8. An electronic musical instrument according to claim 3 wherein said period musical tone detecting means synthesizes a period musical tone signal according to the equation $$f(t) = \sum_{i=1}^{m} (a_i \sin\theta i + b_i \cos\theta i)$$

where i represents an order of harmonic component of the waveform and lies in the range 1 to m, m being an integer larger than 1 and $\theta$ represents a phase angle and a and b are constants.

9. An electronic musical instrument according to claim 2 which further comprises a memory input device connected to said waveform memory means for storing therein a musical tone received from outside.

10. An electronic musical instrument according to claim 2 wherein said phase angle information generating means comprises a frequency number memory device having a plurality of addresses for storing frequency numbers of tone pitches of respective keys of said keyboard, and an accumulator connected to said frequency number memory device for accumulating at a predetermined period the frequency numbers read out from said frequency number memory device.

*11. An electronic musical instrument comprising:*

*memory means having a plurality of memory areas for storing a plurality of waveforms in said memory areas respectively in the form of sampled values, each of said memory areas being constituted by a plurality of storage positions identified by addresses respectively and said sampled values being respectively located in the storage positions of the memory areas in which the waveform constituted by said sampled values is stored;*

*waveform information generating means for generating sequentially waveform information representing respectively ones to be read out from among said plurality of waveforms;*

*readout means responsive to said waveform information for sequentially supplying said memory means with the addresses identifying the storage positions of the memory area corresponding to each of said waveform information and for reading out said sampled values from said memory means in response to said supplied addresses at a rate corresponding to a pitch of a musical tone to be produced; and*

*musical tone producing means for producing said musical tone in accordance with said sampled values read out from said memory means.*

*12. An electronic musical instrument comprising:*

*waveform generating means for generating first to Nth waveforms in a predetermined sequential order to form a single waveform, said waveforms including a Kth waveform wherein N and K are positive integers and $1 \leqq K \leqq N$;*

*repetition number providing means connected to said waveform generating means for providing first to Nth repetition numbers, a Kth repetition number representing the number of times to read out repeatedly the Kth waveform, and said waveform generating means*

*repeatedly generating each of said first to Nth waveforms by the number represented by the corresponding repetition number; and*

*tone producing means for producing a musical tone in accordance with the single waveform formed of said first to Nth waveforms sequentially generated by said waveform generating means.*

*13. An electronic musical instrument comprising:*

*memory means for storing first to Nth modified waveforms which respectively corresponds to first to Nth original waveforms which have been modified, said first to Nth modified waveforms including a Kth modified waveform which corresponds to a modified Kth original waveform, at least one of the harmonic components constituting the Kth modified waveform being formed by phase-shifting the harmonic component having the same order number among harmonic components constituting the Kth original waveform as said at least one, wherein N and K are positive integers and* $1 \leqq K \leqq N$;

*readout means for reading out said first to Nth modified waveforms in a predetermined sequential order at a rate corresponding to a pitch of a musical tone to be produced; and*

*musical tone producing means for producing said musical tone in accordance with said first to Nth modified waveforms sequentially read out from said memory means.*

*14. An electronic musical instrument comprising:*

*memory means having a plurality of storage positions identified by addresses respectively for storing a waveform in the form of sampled values which are located at said storage positions respectively;*

*detecting means for detecting a sampled value whose value is zero or in the vicinity of zero from among said sampled values and then for sending out an address of the storage position in which said detected sample value is located as a start address;*

*readout means responsive to said start address for supplying said memory means with said start address and addresses succeeding to said start address and for reading out the sampled values corresponding to said start address and said succeeding addresses from said memory means at a rate corresponding to a pitch of a musical tone to be produced; and*

*musical tone producing means for producing said musical tone in accordance with said sampled values read out from said memory means.*

*15. An electronic musical instrument comprising:*

*memory means having a plurality of storage positions identified by addresses respectively for storing a waveform in the form of sampled values which are located at said storage positions respectively;*

*portion designating means for manually designating a certain portion of said waveform;*

*readout means connected to said portion designating means for supplying said memory means with addresses of the storage positions in which said certain portion is located and for sequentially reading out the sampled values located in said storage positions identified by said supplied addresses at a rate corresponding to a pitch of a musical tone to be produced; and*

*tone producing means for producing a musical tone in accordance with said sampled values read out from said memory means.*

*16. An electronic musical instrument comprising:*

*means for sampling and storing an input musical sound waveshape,*

*musical tone period detector means for determining the periods of the stored sound waveshape and assigning to each such period a serial number,*

*element selection setting means for specifying by serial number a subset of said periods, said serial numbers being specified in a desired order of period readout,*

*means for reading out said periods of the stored sound waveshape as specified by said set of serial numbers, in the order specified thereby; and*

*means for utilizing said read out periods to recreate a musical sound.*

*17. An electronic musical instrument according to claim 16 wherein;*

*said element selection setting means also specifies the particular serial number of a certain period which is to be repeatedly read out during a sustain portion of said recreated musical sound, and wherein;*

*when said reading out means reaches said certain period specified by said particular serial number it repeatedly reads out said certain period for the entire duration of said sustain, and thereafter continues to read out the remaining periods of said subset in accordance with said specified serial numbers.*

*18. An electronic musical instrument comprising:*

*a waveshape memory for storing sampled amplitudes of a musical tone,*

*means for assigning serial numbers to portions of the stored musical tone waveshape and for relating such serial numbers to the addresses in said memory at which each such portion is stored,*

*means for designating the serial numbers of portions of said musical tone to be reproduced, said serial numbers being specified in the order of desired reproduction,*

*means for reading out from said waveshape memory the portions so designated by serial number, in the order specified, each portion being read out beginning from the related address indicated by said assigning means, and*

*means for producing a musical sound from said read out portions.*

*19. An electronic musical instrument according to claim 18 wherein said designating means also specifies the number of times the portion of said musical tone designated by each serial number is to be repeatedly read out, and wherein said reading out means reads out each portion repeatedly for the designated number of times before beginning readout of the portion specified by the next in order serial number.*

*20. An electronic musical instrument comprising:*

*means for sampling and storing an input musical sound,*

*means for determining periods of said stored musical sound,*

*means for analyzing the spectra of each of said periods of stored musical sound, and for resynthesizing and replacing said stored musical sound with a new musical sound having substantially the same content as said periods of stored musical sound but with all of the harmonics of each period of the new musical sound being at a substantially zero amplitude level at the ends of each of said periods; and*

*means for producing a musical tone by reading out said new stored musical sound, including sequential readout of different, noncontiguous periods thereof, phase discontinuities therebetween being eliminated since all of the harmonics of the periods of the new sound are at a substantially zero amplitude level at the ends of each of said periods.*

*21. An electronic musical instrument, comprising:*

*analog-to-digital converting means for converting an analog external sound signal into a digital waveform signal which represents a waveform corresponding to the waveform of said analog external sound signal;*

*memory means for storing the digital waveform signal output from said analog-to-digital converting means;*

*digital-to-analog converting means for converting the digital waveform signal output from said memory means into an analog sound signal having a waveform determined by said digital waveform signal;*

*pitch designating means for designating a pitch of the sound produced based on the analog sound signal derived from said digital-to-analog converting means;*

*address control logic circuit means coupled to said memory means for designating memory addresses for writing and reading the digital waveform signal; and*

*control means coupled to said address control logic circuit means and to said pitch designating means for supplying to said address control logic circuit means record and reproduce commands for writing and reading said digital waveform signal in and from the memory means, and for instructing said address control logic circuit means to designate a memory address with a speed determined by said pitch designating means when the digital waveform signal is read out from said memory means, so that a sound having a waveform determined by the read out digital waveform signal and a frequency determined by said pitch designating means can be reproduced.*

*22. An electronic musical instrument, comprising:*

*an analog-to-digital converting means for converting an external sound signal into a digital waveform signal;*

*memory means for storing said digital waveform signal;*

*address control logic circuit means for designating memory addresses for writing and reading the digital waveform signal; and*

*control means for supplying to said address control logic circuit means record and reproduce signals for writing and reading said digital waveform signal in and from said memory means;*

*wherein said address control logic circuit means includes address providing means for providing current addresses of said memory means, renewal means for renewing the address provided by said address providing means, pitch storage means for storing pitch data for determining the renewal speed of said renewal means, end storage means for storing the end address of said renewed address, means for controlling sustain loop designation of the address of said memory means, loop start storage means for storing the start address of the loop designation, loop end storage means for storing a value indicative of the end address of the loop designation, first comparing means for determining whether the current address provided by the address providing means coincides with or exceeds the end address of loop designation provided by the loop end storage means, and for providing a loop end signal in response to said determination to cause the start address of said loop start storage means to be provided by said address providing means, and second comparing means for comparing the current address provided by said address providing means and the content of said end storage means, and for providing an end signal to control the operation of the renewal means when the current address provided by said address providing means coincides with or exceeds the content of said end storage means.*

*23. An electronic musical instrument comprising:*

*memory means for storing a waveshape having a plurality of periods;*

*designating means for manually designating a plurality of portions of said waveshape and sequential readout order of the designated portions by a performer;*

*pitch information generating means for generating pitch information representing a pitch of a musical tone to be produced;*

*readout means for reading out said designated portions in order of said readout order and in accordance with said pitch information; and*

*musical tone producing means for producing said musical tone which is based on said designated portions.*

*24. An electronic musical instrument, comprising:*

*memory means for storing a waveshape having a plurality of periods;*

*designating means for designating a plurality of portions of said waveshape, sequential readout order of the designated portions and a repetition number corresponding to each of said designated portions;*

*pitch information generating means for generating pitch information representing a pitch of a musical tone to be produced;*

*readout means for reading out said designated portions in order of said readout order and in accordance with said pitch information, each of said designated portions being repetitively read out in accordance with its corresponding repetition number; and*

*musical tone producing means for producing said musical tone which is based on said designated portions.*

*25. A tone information processing device for an electronic musical instrument, comprising:*

*analog-to-digital converting means for converting at least one analog external sound waveform signal into a digital waveform signal which represents a waveform corresponding to the waveform of said external sound waveform signal;*

*memory means for recording said digital waveform signal as outputted from said analog-to-digital converting means;*

*reading means for reading out said digital waveform signal recorded in said memory means at a rate corresponding to a designated tone frequency of a particular note;*

*digital-to-analog converting means for converting the digital waveform signal read out from said memory means into an analog sound signal which has the waveform determined by said digital waveform signal;*

*note frequency designating means coupled to said reading means for designating a pitch of the sound produced based on the analog sound signal derived from said digital-to-analog converting means; and*

*determining means coupled to said memory means and said reading means for determining start and end addresses of reading of said digital waveform signal recorded in said memory means in relation to the waveform of said digital waveform signal.*

*26. A tone information processing device for an electronic musical instrument, comprising:*

*analog-to-digital converting means for converting an analog external sound waveform signal into a digital waveform signal which represents a waveform corresponding to the waveform of said external sound waveform signal;*

*record memory means for recording said digital waveform signal as outputted from said analog-to-digital converting means;*

*reading means for reading out said digital waveform signal recorded in said record memory means at a rate corresponding to a designated tone frequency of a particular note;*

*digital-to-analog converting means for converting the digital waveform signal read out from said record memory means into an analog sound signal which has the waveform determined by said digital waveform signal;*

*note frequency designating means coupled to said reading means for designating a pitch of the sound produced based on the analog sound signal derived from said digital-to-analog converting means; and*

*setting means coupled to said record memory means for setting start and end addresses of reading of said digital waveform signal recorded in said record memory means substantially at zero crossing points of said waveform signal.*

*27. The tone information processing device according to claim 26, wherein said device includes designating means for designating start and end addresses of reading out said digital waveform signal in said record memory means and wherein said reading means includes means for repeatedly reading out a portion of the digital waveform signal by repeatedly designating addresses between said designated start and end addresses.*

*28. The tone information processing device according to claim 26, wherein said reading means includes a CPU, a work memory for storing data used for a control operation of said CPU and a waveform R/W controller coupled to said record memory means and said CPU.*

*29. The tone information processing device according to claim 28, wherein said waveform R/W controller has a multiple channel structure for providing address signals to said record memory means on a time division basis.*

*30. A waveform generating apparatus for an electronic musical instrument, comprising:*

*waveform information storage means for storing musical tone waveform information as a series of waveform data:*

*interval setting means for selecting a plurality of intervals from said waveform information storage means and for setting start and end address data of each interval and a read sequence of each interval; and*

*reading means for repeatedly reading out the waveform data stored in said waveform information storage means in accordance with the interval, and for reading out the waveform data in accordance with the read sequence set by said interval setting means.*

*31. A waveform generating apparatus for an electronic musical instrument comprising sampling means for sampling external sounds, storage means for storing waveform data of the external sounds sampled by said sampling means, reading means for reading out the waveform data stored in said storage means, and musical tone generating means for generating a musical tone corresponding to the waveform data read out by said reading means, comprising:*

*interval setting means for selecting a plurality of intervals from said waveform data storage means and for setting start and end address data of each interval and a read sequence of each interval; and*

*reading means for repeatedly reading out the waveform data stored in said waveform data storage means in accordance with the intervals and for reading out the waveform data in accordance with the read sequence set by said interval setting means.*

*32. An electronic musical instrument comprising:*

*memory means for storing digital waveform signals;*

*designating means for designating a plurality of loop intervals of the digital waveform signals stored in said memory means; and*

*output means for repeatedly reading the digital waveform signals in said plurality of loop intervals designated by said designating means from said memory means and outputting tone waveform signals.*

*33. An electronic musical instrument according to claim 32, wherein said designating means comprises second designating means for designating loop duration for each of said plurality of loop intervals, and said output means repeatedly reads the digital waveform signals in said plurality of loop intervals for a period of the loop duration designated by said second designating means and outputs tone waveform signals.*

* * * * *